United States Patent
Tabata et al.

(10) Patent No.: US 7,382,087 B2
(45) Date of Patent: Jun. 3, 2008

(54) OZONE GENERATOR SYSTEM AND OZONE GENERATING METHOD

(75) Inventors: Yoichiro Tabata, Tokyo (JP); Yujiro Okihara, Tokyo (JP); Masayuki Ishikawa, Tokyo (JP); Tetsuya Saitsu, Tokyo (JP); Hatsuo Yotsumoto, Tokyo (JP)

(73) Assignee: Toshiba Mitsubishi-Electric Industrial Systems Corporation, Tokyo (JP)

( * ) Notice: Subject to any disclaimer, the term of this patent is extended or adjusted under 35 U.S.C. 154(b) by 579 days.

(21) Appl. No.: 10/538,780

(22) PCT Filed: Dec. 14, 2004

(86) PCT No.: PCT/JP2004/018647

§ 371 (c)(1),
(2), (4) Date: Jun. 10, 2005

(87) PCT Pub. No.: WO2005/080263

PCT Pub. Date: Sep. 1, 2005

(65) Prior Publication Data

US 2006/0049738 A1    Mar. 9, 2006

(30) Foreign Application Priority Data

Feb. 25, 2004    (JP) .............................. 2004-050009

(51) Int. Cl.
*H01J 27/26*    (2006.01)

(52) U.S. Cl. .............................. 313/362.1; 313/231.01

(58) Field of Classification Search ............. 313/362.1, 313/231.01, 231.31, 231.51; 315/111.21
See application file for complete search history.

(56) References Cited

U.S. PATENT DOCUMENTS

| 5,047,127 A | 9/1991 | Tottori et al. |
| 5,759,497 A | 6/1998 | Kuzumoto et al. |
| 5,810,978 A | 9/1998 | Nakatsuka et al. |
| 6,046,533 A * | 4/2000 | Nakatsuka .............. 313/362.1 |
| 2004/0223893 A1 | 11/2004 | Tabata et al. |

FOREIGN PATENT DOCUMENTS

| JP | 63-040705 | 2/1988 |
| JP | 01-282104 | 11/1989 |
| JP | 01-298003 | 12/1989 |
| JP | 03-218905 | 9/1991 |
| JP | 08-012304 | 1/1996 |
| JP | 08-059213 | 3/1996 |
| JP | 08-165106 | 6/1996 |

(Continued)

Primary Examiner—Vip Patel
(74) Attorney, Agent, or Firm—Leydig, Voit & Mayer, Ltd.

(57) ABSTRACT

An ozone generating system and an ozone generating method producing ozone at a high concentration and operating at high efficiency, in which a raw material gas with no nitrogen added and mainly containing oxygen is used. The amount of generation of $NO_X$ by-product is null. A raw material gas not containing nitrogen and mainly containing oxygen is supplied to an ozone generator, an AC voltage is applied to produce discharge light having a wavelength of 428 nm to 620 nm, a catalytic material containing a photocatalytic material with a band gap energy of 2.0 eV to 2.9 eV is provided on an electrode or a dielectric in a discharge region, gas pressure is kept at 0.1 MPa to 0.4 MPa, and ozone is generated.

32 Claims, 22 Drawing Sheets

FOREIGN PATENT DOCUMENTS

| | | |
|---|---|---|
| JP | 09-208202 | 8/1997 |
| JP | 11-021110 | 1/1999 |
| JP | 11-278809 | 10/1999 |
| JP | 2001-187390 | 7/2001 |
| JP | 2001-294407 | 10/2001 |
| JP | 2002-255512 | 9/2002 |
| JP | 2002-274815 | 9/2002 |
| JP | 2003-089507 | 3/2003 |

* cited by examiner

OZONE GENERATOR SYSTEM AND OZONE GENERATING METHOD

TECHNICAL FIELD

The present invention relates to an ozone generator system and an ozone generating method, and particularly to an ozone generator system which includes a high voltage electrode and a low voltage electrode, causes discharge by the application of an AC voltage between them, and generates an ozone gas efficiently, and an ozone generating method. In particular, the invention relates to a nitrogen-free or nitrogen suppression ozone generator system and ozone generating method, in which a clean ozone gas is obtained.

BACKGROUND ART

In the prior art, following various techniques are developed.

According to patent document 1, in an ozone generator system, a raw material gas is supplied from a first raw material supply system for supplying a specified flow rate from an oxygen cylinder with a purity of 99.995% or higher, and from a second raw material supply system for supplying a specified flow rate of second raw material gas (nitrogen, helium, argon, or carbon dioxide) with a purity of 99.99% or higher, a high AC voltage is applied between electrodes, silent discharge (dielectric barrier discharge) is caused between the electrodes through a dielectric, and the raw material gas is transformed into an ozone gas. It is disclosed that although the cause of a time-varying reduction phenomenon of ozone concentration is not clear, the time-varying reduction phenomenon exists in the ozone gas once generated by the generator under high purity oxygen, and as means for suppressing the time-varying reduction, it is effective to add a nitrogen gas or the like to the high purity oxygen.

Patent document 2 discloses that a mixture ratio of an oxygen gas as a raw material gas of an ozone apparatus to a nitrogen gas is set in a range of from 1:0.0002 (200 ppm) to 0.0033 (3300 ppm). FIG. 2 of the patent document 2 shows a characteristic of the amount of addition of nitrogen gas and the concentration of ozone obtained by the ozone generator system, and as the amount of addition of nitrogen at which sufficient ozone concentration (about 100 g/m³ or more) is obtained, the mixture ratio is set to 1:0.0002. In order to suppress the amount of generation of nitrogen oxide as a reaction poisonous substance from the generator to be small, the mixture ratio is set to 1:0.0033 or less. It is disclosed that when the oxygen raw material gas in which the amount of addition of nitrogen is 100 ppm or less is used, the ozone concentration of 20 g/m³ (9333 ppm) is merely obtained, and the ozone concentration which is ⅙ or less of the ozone concentration of 120 g/m³ (56000 ppm) at the time of a nitrogen additive rate of 3300 ppm is merely obtained. Besides, in the specification, it is disclosed that although an argon gas, instead of the nitrogen gas, is added to the high purity oxygen, the ozone concentration of about 20 g/m³ (9333 ppm) is merely obtained independently of an argon mixture ratio, and the argon gas does not have an effect to raise the ozone concentration.

Besides, according to patent document 3, in an ozone generator system, a TiO₂ film is formed on a discharge surface of a dielectric. Instead of the addition of high purity nitrogen gas, titanium oxide having a metal element ratio of 10 wt % is coated on the discharge surface of the dielectric in the generator.

Besides, in patent document 4, it is proposed that in an ozone apparatus which can obtain a maximum ozone concentration of 180 g/m³, the amount of addition of nitrogen is made 0.01% to 0.5% in order to suppress the time-varying reduction of ozone concentration.

In the prior art, with respect to the mechanism of generating the ozone gas by silent discharge, it is said that the generation is carried out by following reaction equations.

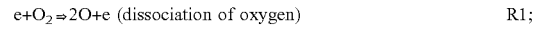

(ozone generation based on triple collision by oxygen atom and oxygen molecule)

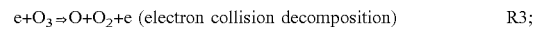

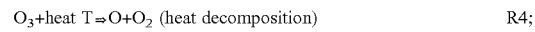

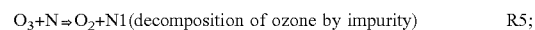

Incidentally, N1 denotes what is different from N.

The generation of the ozone gas is such that the oxygen molecule is dissociated into the oxygen atoms in R1, and the ozone is generated based on the triple collision by the oxygen atom and the oxygen molecule in R2.

As the decomposition of the generated ozone, the electron collision decomposition of R3, the heat decomposition of R4, the decomposition of ozone by the impurity of R5, or the like is conceivable.

As the ozone gas which can be extracted from the generator, the ozone gas is obtained according to the balance state of the reaction equations of R1 to R5. That is, the ozone gas can be extracted by a following equation.

extracted ozone=(R1*R2)−(R3+R4+R5+ . . . )

Besides, in the prior art, it is stated that in the case of the high purity oxygen, with respect to the ozone generated by the ozone generation mechanism, since the ozone concentration is reduced with the passage of time during the operation, the nitrogen gas is added to the raw material gas, or TiO₂ as the photocatalyst is applied to the discharge electrode surface, so that a following reaction occurs, and the time-varying reduction of the ozone concentration is prevented.

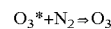

Patent document 1, patent document 2 and patent document 3 are for stably obtaining the ozone concentration at a relatively low ozone concentration of about 120 g/m³.

Incidentally, in the respective conventional techniques, different phenomena as set forth below are described. Although patent document 1 discloses that a gas of helium, argon, or carbon dioxide is also effective as a gas other than the nitrogen gas addition, patent document 2 discloses that in the case of the high purity oxygen, the argon gas is not effective.

Although patent document 1 discloses that the amount of addition of the second raw material gas is made 10000 ppm to 100000 ppm, patent document 2 discloses 200 ppm to 2300 ppm which is different.

Patent document 1 discloses that in the high purity oxygen, the concentration is reduced by the operation for about one hour, while patent document 3 discloses the concentration reduction after the operation for about 7 hours, which is different.

Besides, patent document 1 discloses at column 6, line 49 to column 7, line 2 that as an ozone concentration immediately after the start of the operation, data is shown in FIG. 6 in which an ozone concentration of only 75 g/m³ is obtained at a time of a percentage content of 0 vol %, while FIG. 5 shows that an ozone concentration immediately after the start of the operation in high purity oxygen is a maximum concentration of 143.5 g/m³ (see Table 3). The two experimental data indicate quite different values and phenomena, and exhibit very unclear facts.

As stated above, in the conventional technique in which with respect to the ozone generated in the apparatus, the nitrogen gas or the like is added to the oxygen gas in order to suppress the time-varying reduction of the ozone concentration, the results and effects vary according to the conditions, and although an experimental verification was made for patent document 1, patent document 2, and patent document 3, patent document 1 and patent document 3 could not be substantiated, and it turned out that the addition of a single noble gas (helium, neon, argon, xenon, etc.) other than nitrogen was ineffective.

Both patent document 1 and patent document 4 disclose that the reduction of the ozone concentration is the time-varying reduction, however, it is disclosed that when it is once reduced, it does not return to the original ozone concentration. From the recitation that the concentration does not return to the original ozone concentration, it can not be judged to be the time-varying reduction, and the role of the addition of nitrogen is not clear.

Further, when the nitrogen is added at an additive rate of approximately 0.15% (1500 ppm) or more, in addition to the ozone gas, a large amount of $NO_X$ by-product gas such as $N_2O_5$ or $N_2O$ is generated by the silent discharge.

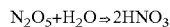

$$N_2O_5+H_2O \Rightarrow 2HNO_3$$

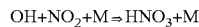

$$OH+NO_2+M \Rightarrow HNO_3+M$$

Besides, when a large amount of $NO_X$ by-product is produced, a nitric acid ($HNO_3$) cluster (vapor) is generated by the reaction of the $NO_X$ gas component and moisture contained in the raw material gas, and the ozonized gas is extracted in such a state that a trace amount of $NO_X$ gas and nitric acid cluster, together with oxygen and ozone gas, are mixed. When the amount of the trace amount of nitric acid cluster contained is several hundred ppm or more, there are problems that rust of chromium oxide or the like is deposited by nitric acid on the inner surface of a stainless pipe as an ozone gas outlet pipe, a metal impurity is mixed into a clean ozone gas, the metal impurity in a reaction gas for a semiconductor manufacturing apparatus has a bad influence on the manufacture of a semiconductor, and the trace amount of the generated nitric acid cluster has a bad influence as a reaction poisonous substance on "an etching process of a silicon oxide film by ozone" or "ozone water washing of a wafer or the like" of the semiconductor manufacturing apparatus.

In the ozone apparatus of the conventional technique, the concentration of the extracted ozone is low, and in order to extract ozone with a high concentration of 200 g/m³ or more, there is only a method of increasing the nitrogen additive rate or a method of decreasing the gas flow rate. In the method of increasing the nitrogen additive rate, as described above, there is a problem that the by-product gas of $NO_X$ is increased.

Besides, when the gas flow rate is decreased, there are problems that the amount of ozone generation is extremely lowered, and production efficiency on the side of using the ozone becomes worse.

Further, in the newest "etching apparatus of an oxide film by ozone" or "ozone water washing of a wafer or the like", a high ozone concentration of 200 g/m³ or more is needed, and with respect to the amount of ozone generation, there is a request for an ozone apparatus having an ozone capacity of several tens g/h or more on an economically viable basis in production on the user side. Further, in a semiconductor manufacturing apparatus, an apparatus which produces less reaction poisonous material, such as nitric acid, has been needed.

Besides, although a trace amount, about 1%, of $N_2$ gas is added in order to increase the generation efficiency of an ozone gas, the $N_2$ gas is transformed into $NO_X$ or nitric acid cluster (vapor) by discharge in the generator.

Thus, in the discharge space (discharge region), as the gas flow velocity becomes low, or the injected discharge power becomes high, the amount of generation of $NO_X$ as the nitrogen oxide is increased, and therefore, there are problems that the ozone generation efficiency is lowered, and the concentration of the extracted ozone is reduced.

Next, as specific main production apparatuses using high concentration ozone gas and products obtained by the production apparatuses, the following are enumerated.

TABLE 1

Main production apparatus using ozone gas and products

| field of production apparatus | obtained product | function |
|---|---|---|
| chemical vapor deposition apparatus, ALD thin film deposition apparatus | semiconductor | conductive thin film insulating thin film dielectric thin film semiconductor thin film |
|  | capacitor | high dielectric constant thin film |
|  | flat panel | conductive tin film insulating thin film dielectric thin film semiconductor thin film |
|  | solar cell | conductive thin film insulating thin film dielectric thin film semiconductor thin film |
|  | magnetic tape | high magnetic thin film |
|  | superconducting thin film | superconducting thin film |
| ozone condensing apparatus | ultra high concentration ozone gas | ozone condensation |
| pulp bleaching apparatus | paper | ozone bleaching |

FIG. 24 shows an example of a conventional chemical vapor deposition apparatus (that is, CVD apparatus: Chemical Vapor Deposition) for forming a thin film by using a high concentration ozone gas or an ALD thin film deposition apparatus (Atomic Layer Deposition).

In FIG. 24, reference numeral 600 denotes a CVD apparatus or an ALD deposition apparatus apparatus to obtain a metal vapor by laser ablation; 601, a laser apparatus; 602, a laser beam diaphragm lens; 603, a chamber; 604, a beam inlet port; 607, a beam inlet window; 605a, an ozone gas inlet port; 605b, a noble gas inlet port; 606, a gas exhaust port; 608, a table for a processed material; 610, a processed material (semiconductor wafer, etc.); 612, a stand; 611, a metal target material for a thin film of noble metal such as platinum, ruthenium or palladium; A3000, an ozone gas supply system; and 618, a vacuum apparatus. Incidentally, 10A denotes a noble gas cylinder; 617, a vacuum valve; and 619, exhaust.

In the conventional CVD apparatus or the ALD thin film deposition apparatus, a gas of mixture of an oxygen gas from an oxygen gas cylinder 10 and a nitrogen gas from a nitrogen cylinder 10B in a range of about 0.01 to 1% with respect to the oxygen gas is supplied to an ozone generator system A300, a high concentration ozone gas is generated in the ozone generator system, the high concentration ozone gas is inputted to the CVD apparatus or the ALD thin film deposition apparatus, and an oxidation reaction process of ozone is performed. The operation of the apparatus is such that the processed material 610 is mounted on the processed material table 608, vacuum drawing is performed by the vacuum apparatus 618, and moisture or the like adhered to the surface of the processed material 610 is removed. Subsequently, an ozone gas of about 100 g/m³ is introduced into the chamber 603 in a negative pressure state, the temperature is raised up to several hundred degrees by a heater in the processed material table 608 and a temperature adjustment part 609, a carbon compound, moisture, hydrogen compound and the like adsorbed on the surface of the processed material 610 are subjected to a thermal reaction process by the ozone gas, and a cleaning process of the surface of the processed material 610 is performed (0. cleaning step).

At a next step, in the evacuated chamber 603, a pulse laser beam 613 having intense energy is focused on and is made to impinge on the thin film target material 611 as the thin film material in the chamber from the laser apparatus 601 mounted outside, so that a metal vapor 615 is released by local heating from the thin film target material 611 into the chamber, the low pressure metal vapor is made to fill it, and metal particles of the order of from submicron to several microns are deposited onto a surface at an atomic layer level by the temperature control of the processed material mounted on the processed material table 608 (1. deposit step). With respect to the metal deposited onto the surface of the processed material at the atomic layer level, a high concentration ozone gas of about 300 g/m³ in a negative pressure state is introduced into the chamber, the temperature is raised up to several hundred decrees by the heater in the processed material table 608 and the temperature adjustment part 609, and the deposited metal is transformed into metal oxide (2. ozone oxidation reaction step).

At a final step, in a state where the inside of the chamber is made to be filled with a noble gas as an inert gas, or the like, a heat treatment at a specified temperature is performed by the heater in the processed material table 608 and the temperature adjustment part 60, and the metal oxide is made an effective metal oxide crystal (3. annealing step). The above steps of 1. deposit step→2. ozone oxidation reaction step→3. annealing step are repeated until the deposited thin film comes to have a desired thickness, and the thin film effective in function is formed. Although the process of forming a thin film such as a semiconductor includes, in addition to the above steps, various complicated steps such as a doping step, an etching step, and a resist peeling step, they are omitted here.

As products using thin films, there are a capacitor mounted on a board of an electronic apparatus, a semiconductor element, a flat panel as a display part of a television, a solar battery cell used for a solar battery, a superconducting thin film element, and a magnetic storage tape.

In the thin films used for these products, reduction in film thickness is required for purposes as follows:
i) improvement in integration
ii) reduction in cost of element
iii) improvement in function
iv) reduction in electric power.

In order to realize products having achieved the objects as stated above, with respect to requested performance of a thin film itself, one having following functions is required.

(1) semiconductor thin film
(2) insulating thin film
(3) oxide metal thin film
(4) ferroelectric thin film for a capacitor or a semiconductor,
(5) ferromagnetic thin film for magnetic recording
(6) thin film as an optical material for a photoelectric device
(7) superconducting thin film As the semiconductor thin film of (1), there is a silicon oxide thin film. As the insulating thin film of (2), attention is given to a thin film of $ZrO_2$, $HfO_2$, or $Ln_2O_3$ excellent in insulation. As the oxide metal thin film of (3), there is $RuO_2$ or $SrRuO_3$ instead of platinum and copper. As the ferroelectric thin film of (4), there is $Pb(Zr_xTi_{1-x})O_3$ or $(Ba_xSr_{1-x})TiO_3$ for a nonvolatile memory. As the ferromagnetic thin film of (5), there is $Y_3Fe_5O_{12}$. As the thin film as the optical material of (6), attention is given to a high speed optical switching function of $LiNbO_3$ or the like, and attention is given also to a thin film as a waveguide. As the superconducting thin film of (7), there is a metal oxide such as $YBa_2CuO_7$.

Any of these thin films are obtained by crystal growth of metal oxide of noble metal as transition metal of Group IV, or GroupIII-V under a specific environment. In order to obtain these metal oxides, there is required a thin film realized by only high thermodynamic oxidation capacity (oxidation comparable to high pressure oxygen corresponding to a pressure of $10^{18}$ atmospheres in an equivalent oxygen partial pressure) of the ozone gas, and it can be hardly realized unless the ozone gas is used.

A conventional CVD apparatus and an ALD thin film deposition apparatus to obtain a metal oxide thin film having the high function as stated above have problems as set forth below.

i) Performance quality of the thin film is poor.
ii) Performance of the thin film is uneven.
iii) Deposition speed of the thin film is low.

As the cause of i) and ii), a metal impurity, a carbon impurity, a nitrogen impurity, hydrogen, or moisture is mixed at respective steps in the apparatus, and there are problems of the insulation of the thin film element, the increase of leak current, the fluctuation of performance, the deterioration of mechanical adhesion of the thin film itself, and the like.

In a conventional ozone gas condensing apparatus using a high concentration ozone gas, a high concentration ozone gas obtained from an ozone generator system is made to pass through a tank filled with silica gel cooled to about −60° C. to −100° C. to form liquefied ozone, and it is made to be adsorbed (adsorption step) by the filling silica gel, and then, the adsorbed liquefied ozone is heated up to approximately a room temperature, a carrier gas such as oxygen is made to flow through the tank filled with the silica gel or the like, the liquefied ozone is evaporated (desorption step), and the super-high concentration ozone gas higher than the high concentration ozone gas obtained from the ozone generator system is obtained. In this ozone condensing apparatus, when an impurity such as nitrogen or nitrogen oxide ($NO_X$) is contained in the ozone gas, not only the ozone gas, but also $NO_X$ contained in the gas is liquefied, and the adsorbed $NO_X$ is not desorbed in the desorption step but is accumulated on the silica gel, and there is a problem that the condensing ability of the condensing apparatus is lowered.

In conventional bleaching of pulp, chlorine bleaching has been the mainstream. However, at the time of pulp bleaching, since an organochlorine compound such as harmful dioxin is discharged, there occurs a problem from the viewpoint of environment, and attention is given to an ozone bleaching apparatus which has bleaching ability and does not discharge a harmful material. However, a large ozone apparatus is hard to realize, and there has been a fear that since nitrogen oxide is contained in the ozone gas, a pipe is broken due to corrosion of the pulp bleaching apparatus, and pulp fibers are damaged. Besides, in the case where nitrogen gas is not added to the ozone generator system, a sufficient amount of ozone generation is not obtained, and there have been problems that the ozone generator system becomes large, electric power consumption becomes large, and an economical merit of the ozone bleaching apparatus is lost.

Patent document 1: JP-B-6-21010 (pages 1 to 4, FIG. 1)
Patent document 2: Japanese Patent No. 2641956 (pages 1 to 4, FIGS. 2 to 3)
Patent document 3: JP-A-11-21110
Patent document 4: Japanese Patent No. 2587860

DISCLOSURE OF THE INVENTION

The invention has been made to solve the problems as described above, and provides a nitrogen-free ozone generator system and a nitrogen-free ozone generating method, in which even when a nitrogen gas or a nitrogen by-product material is not contained, ozone generation efficiency can be adequately improved, and a clean ozone gas is generated.

Besides, this invention provides an ozone generator system suitably applied to a chemical vapor deposition apparatus, an ALD thin film deposition apparatus, an ozone condensing apparatus, or a pulp bleaching apparatus.

Further, in a use in which a trace amount of nitrogen gas may be contained in an oxygen gas, there is provided a nitrogen suppression ozone generator system and a nitrogen suppression ozone generating method, in which a trace amount of nitrogen gas is added to accelerate an ozone generation reaction.

SUMMARY OF THE INVENTION

A nitrogen-free ozone generator system and a nitrogen-free ozone generating method of the invention includes a first electrode, a second electrode which is opposite to the first electrode and forms a discharge region having a gap, raw material gas supply means for supplying an oxygen gas as a raw material gas, and a catalytic material which is provided on a dielectric or the electrode in the discharge region and contains a photocatalytic material with a band gap of 2.0 eV to 2.9 eV, an AC voltage is applied between the first electrode and the second electrode from a power supply to inject discharge electric power into the discharge region, the oxygen gas is supplied from the raw material gas supply means to the discharge region, discharge light having at least a light wavelength in a range of 428 nm to 620 nm is irradiated to the catalytic material by discharge, the catalytic material is excited to dissociate the oxygen gas passing through the discharge region into oxygen atoms, a gas pressure of the discharge region through which the oxygen gas passes is kept at 0.1 MPa to 0.4 MPa, and the oxygen gas and the dissociated oxygen atoms are subjected to a bonding process to generate an ozone gas.

Besides, in the ozone generator system of the invention, a gap interval of the discharge region is 0.6 mm or less.

Besides, the nitrogen-free ozone generator system of the invention is used for a chemical vapor deposition apparatus or an ALD (atomic layer deposition) thin film deposition apparatus.

Besides, the ozone generator system of the invention is used for an ozone condensing apparatus.

Besides, the ozone generator system of the invention is used for a pulp bleaching apparatus.

Further, in a use of ozone in which a nitrogen gas may be contained in the oxygen gas, nitrogen (a suppressed quantity of nitrogen) is added, so that an allowable band gap range of the photocatalyst provided on the dielectric or the electrode in the discharge region becomes 2.0 eV to 3.6 eV, and ozone generation reaction is accelerated by using the discharge light (ultraviolet light) of the nitrogen.

According to the nitrogen-free ozone generator system and the nitrogen-free ozone generating method of the invention, the ozone generating efficiency can be adequately improved by the raw material gas not added with the nitrogen gas and mainly containing the oxygen gas, and a clean ozone gas (nitrogen-free ozone gas) containing no by-product material such as $NO_X$ or containing an unavoidable amount thereof can be obtained.

Incidentally, as the raw material gas not added with the nitrogen gas and mainly containing the oxygen gas, although oxygen with a purity of 99.99% is used, specifically, high purity oxygen of 99.995% is used, $N_2$ of $151 \times 10^2$ ppb (that is, 15 ppm) is contained as a maximum allowable amount, and unavoidable $N_2$ is mixed, and unavoidable by-product material such as $NO_X$ is generated. In this invention, the clean ozone gas (nitrogen-free ozone gas) contains the by-product material such as the unavoidable $NO_X$.

Besides, in the ozone generator system of the invention, since the gap interval of the discharge region is made 0.6 mm or less, the light intensity of the discharge light with a light wavelength in the range of 428 nm to 620 nm by the silent discharge is raised, the excitation of the photocatalytic material with a band gap of 2.0 eV to 2.9 eV is resultantly accelerated, and at the same time as the acceleration of dissociation of the oxygen gas, the ozone generation efficiency can also be raised.

Besides, since the nitrogen-free ozone generator system of the invention is used for the chemical vapor deposition apparatus or the ALD thin film deposition apparatus, in the chemical vapor deposition apparatus or the ALD thin film deposition apparatus, the clean ozone gas (nitrogen-free ozone gas) is effective in a cleaning step of removing moisture, hydrogen compound, and carbon compound, adsorbed on the substrate surface when a functionally effective thin film of a semiconductor or the like is produced, and further, it is effective in an ozone oxidation reaction step of transforming deposited metal into oxide metal by the ozone gas, and the quality of the oxide film of the thin film itself can be raised.

Besides, since the ozone generator system of the invention is used for the ozone condensing apparatus, the nitrogen-free ozone gas or the nitrogen suppression ozone gas can suppress the adsorption of an impurity gas in the ozone condensing apparatus, and the accumulation of the adsorption of the impurity gas is suppressed, so that reduction in performance of the condensing apparatus can be suppressed.

Besides, since the ozone generator system of this invention is used for the pulp bleaching apparatus, in the pulp bleaching apparatus, the nitrogen-free ozone gas or the nitrogen suppression ozone gas suppresses the generation of nitric acid due to the combination of moisture and $NO_X$, and therefore, acceleration of corrosion of a gas pipe can be suppressed, and the lifetime of the apparatus can be prolonged.

Further, in the use of ozone in which the nitrogen gas may be contained in the oxygen gas, a trace amount of nitrogen (a suppressed amount of nitrogen) is added, so that the allowable band gap range of the photocatalyst provided on the dielectric or the electrode in the discharge region becomes 2.0 eV to 3.6 eV, and the ozone generation reaction is accelerated by using the discharge light (ultraviolet light) of the nitrogen. Thus, a trace amount of, specifically 10 ppm to 500 ppm, nitrogen gas is made to be contained in the oxygen gas, so that the ozone generation reaction can be accelerated. By the discharge light of the nitrogen, the photocatalytic material with a band gap of up to 3.6 eV can be used.

BEST MODE FOR CARRYING OUT THE INVENTION

Embodiment 1

Figure 1:
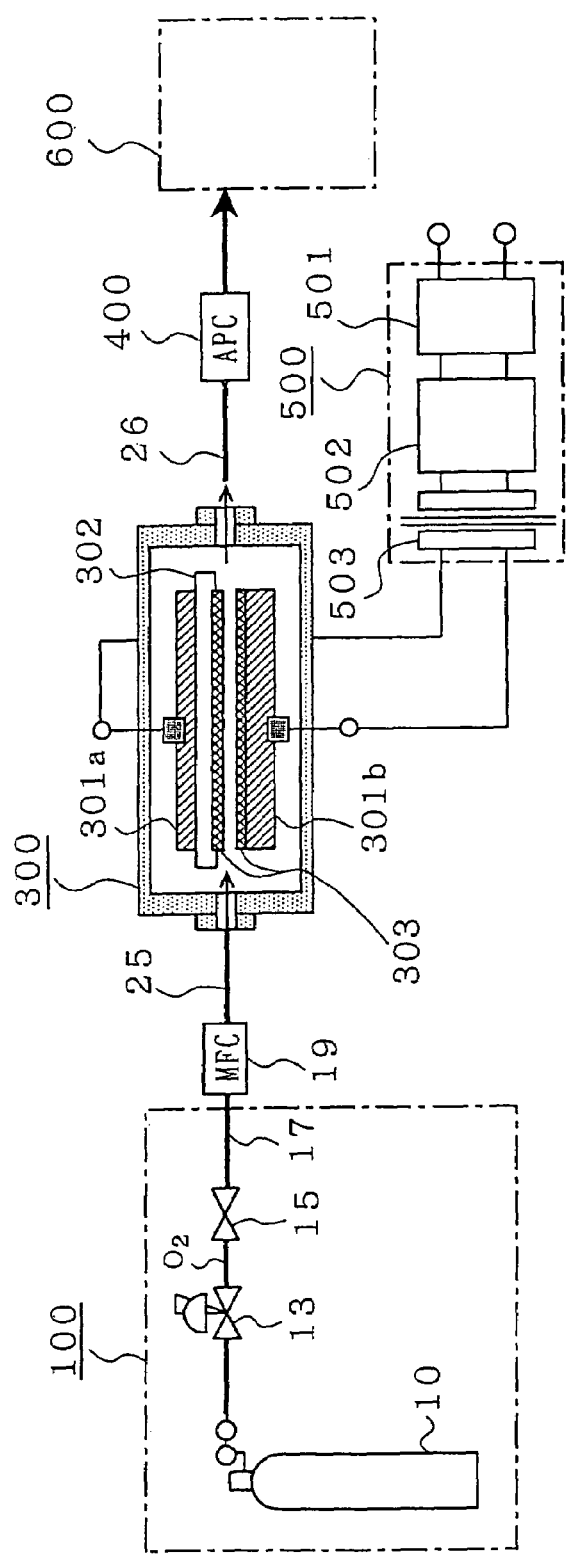
FIG. 1 is a block diagram showing a structure of a gas system in embodiment 1 of the invention.
Figure 2:
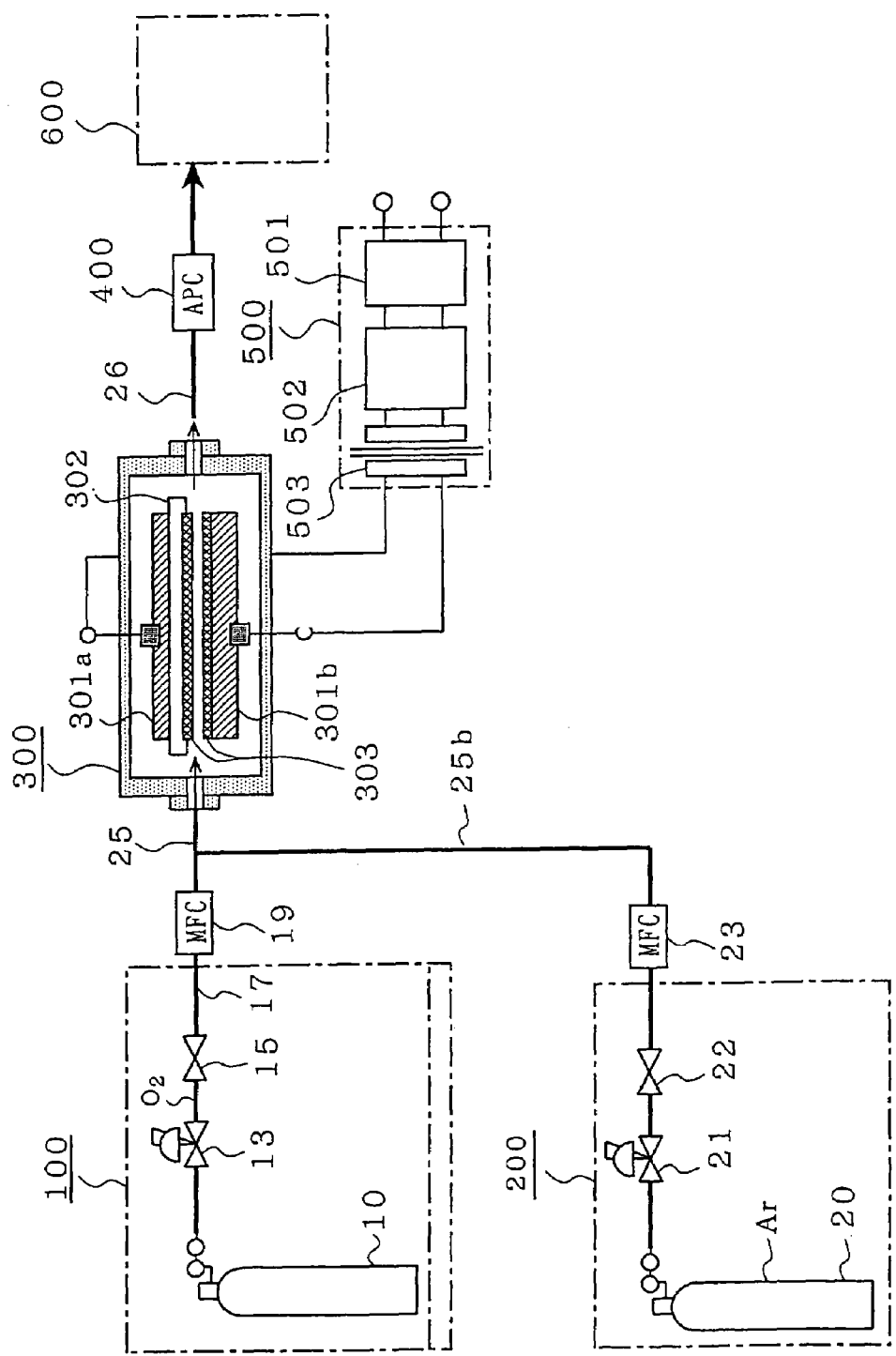
FIG. 2 is a block diagram showing a structure in which an auxiliary raw material gas, such as a noble gas, other than oxygen is added to the gas system in embodiment 1.
Figure 3:
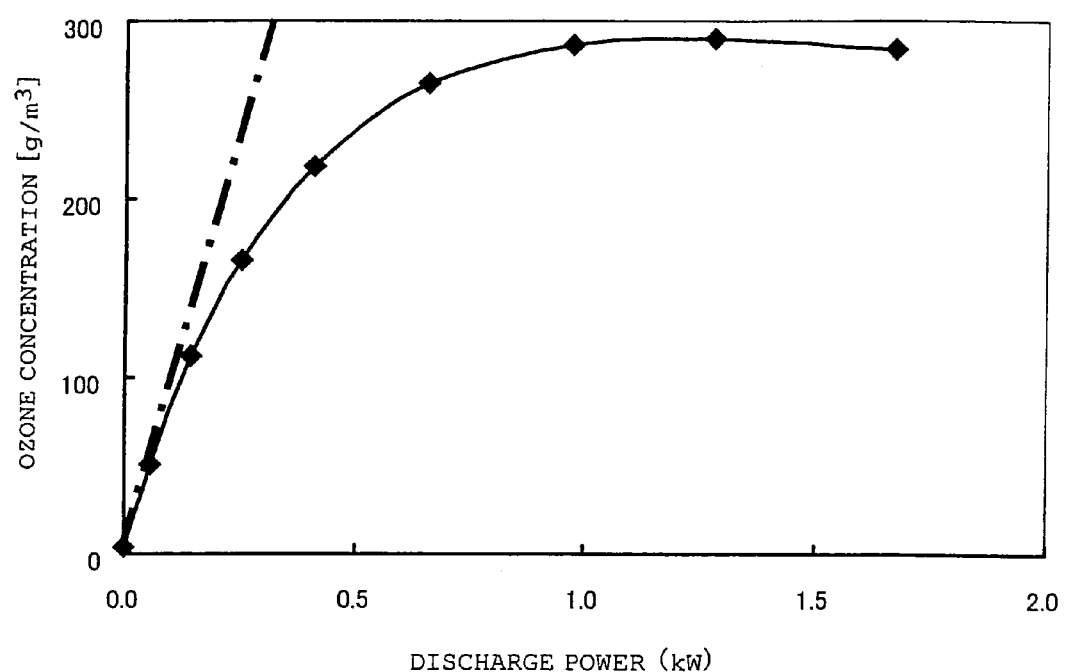
FIG. 3 is a graph view showing an ozone concentration characteristic in embodiment 1.
Figure 4:
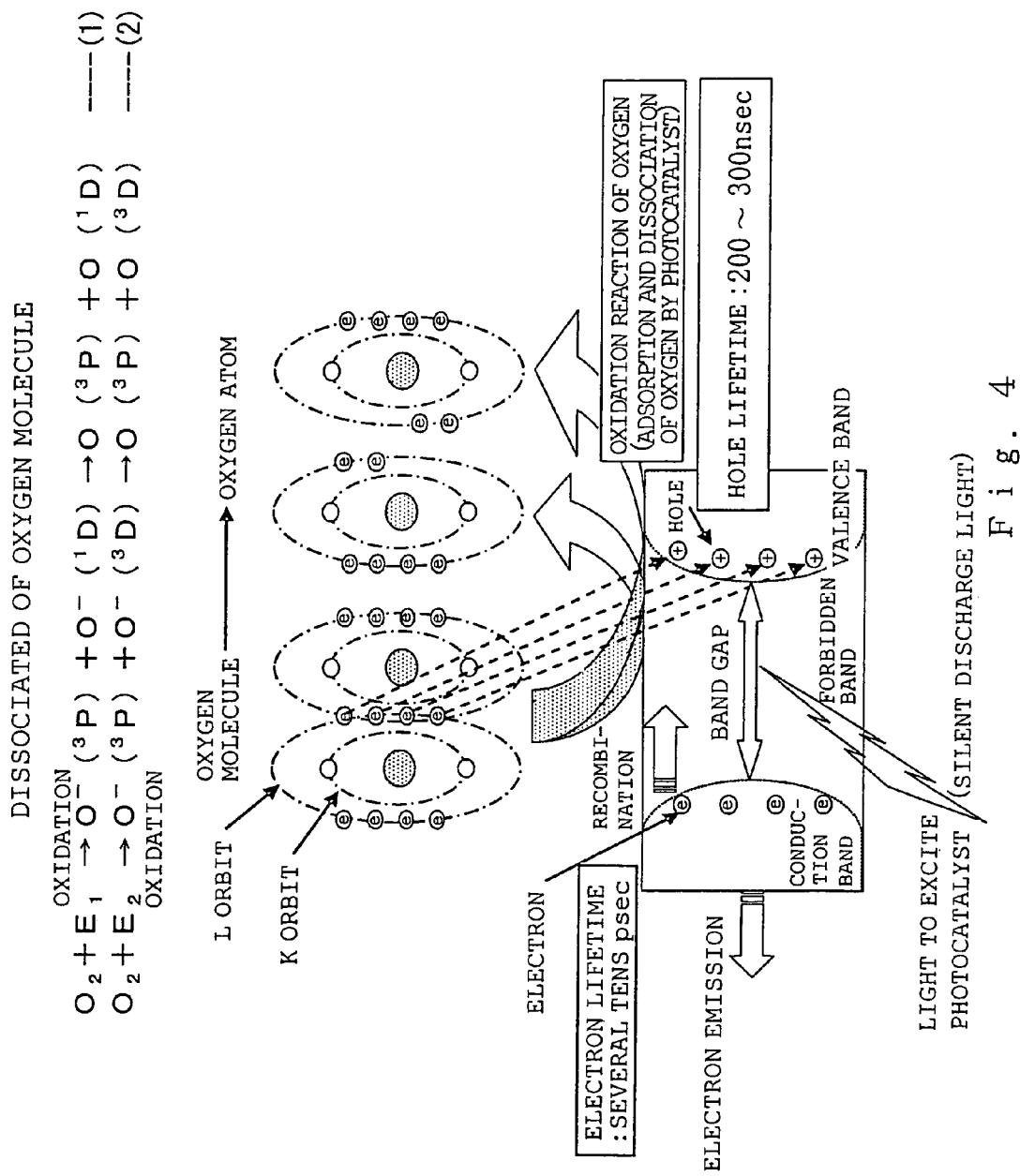
FIG. 4 is a schematic view showing a dissociation mechanism of an oxygen molecule into oxygen atoms by the oxygen molecule and a photocatalyst in embodiment 1.
Figure 5:
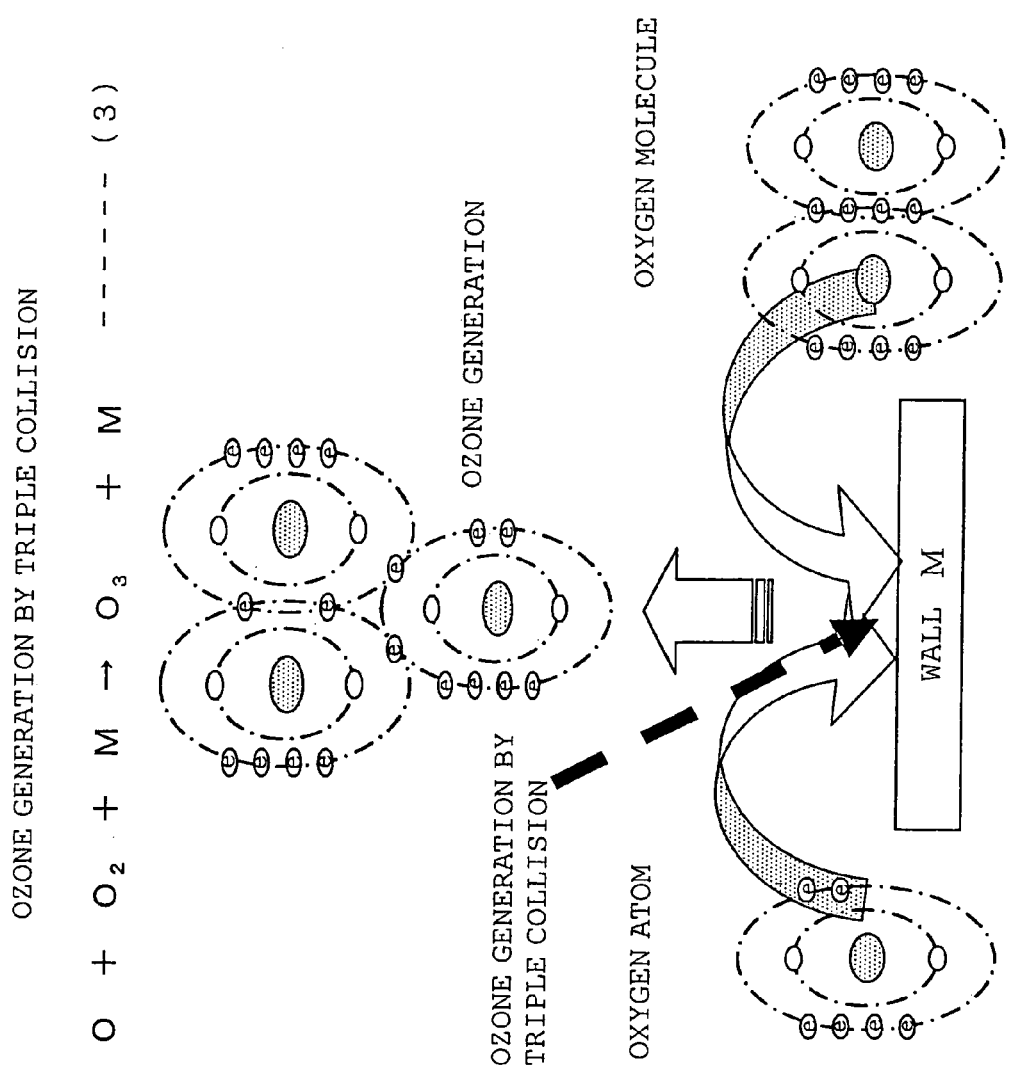
FIG. 5 is a schematic view showing a generation mechanism of ozone by triple collision between the dissociated oxygen atom and oxygen molecule in embodiment 1.
Figure 6:
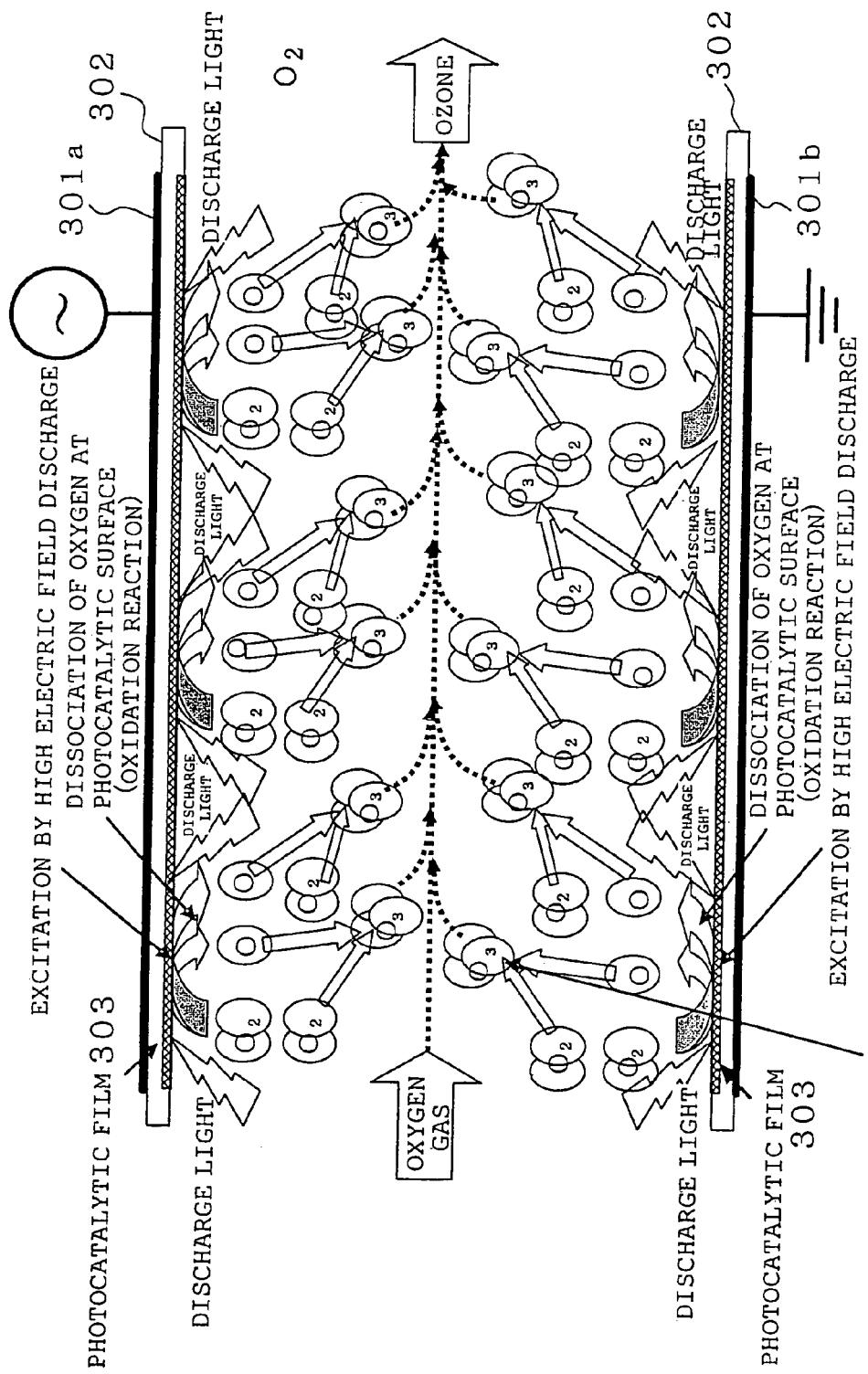
FIG. 6 is a schematic view showing a mechanism from an oxygen gas to ozone generation in a section of an ozone generator of embodiment 1.

Embodiment 1 of the invention will be described with reference to FIG. 1 to FIG. 6. FIG. 1 is a block diagram showing a structure of a gas system in embodiment 1. FIG. 2 is a block diagram showing a structure in which in addition to the oxygen gas, an auxiliary gas such as a noble gas is added to the gas system of embodiment 1. FIG. 3 is a characteristic view showing an ozone concentration characteristic in embodiment 1. FIG. 4 is a schematic view showing a dissociation mechanism of an oxygen molecule into oxygen atoms by the oxygen molecule and a photocatalyst in embodiment 1. FIG. 5 is a schematic view showing a generation mechanism of ozone by triple collision of an oxygen atom and an oxygen molecule in embodiment 1. FIG. 6 is a schematic view showing a mechanism from an oxygen gas to ozone generation in the section of an ozone generator in embodiment 1. Incidentally, in the specification, the same characters in the respective drawings denote the same or like portions.

The ozone generator system of the invention is effective for use with a high concentration ozone gas of 200 g/m$^3$ or more, a clean ozone gas for a semiconductor manufacturing apparatus, a washing apparatus or the like, a nitrogen-free ozone in which by-product such as $NO_X$ is eliminated, or an apparatus having excellent ozone generation efficiency.

In FIG. 1, an A-species raw material supply system 100 to supply oxygen (raw material gas) of a purity of 99.99% includes a high purity oxygen cylinder 10, a pressure reducing valve 13, and an open/close valve 15. A raw material gas 25 is supplied to an ozone generator 300 through a gas flow controller (MFC) 19 to control the gas quantity of the raw material gas.

Incidentally, as the oxygen gas, even when the oxygen with a purity of 99.99% or higher is used, specifically, even when high purity oxygen of 99.995% is used, $N_2$ of 151×10$^2$ ppb (that is, 15 ppm) is contained, and the unavoidable $N_2$ is mixed. However, it is desirable to use an oxygen gas in which the mixing of $N_2$ is smaller.

In FIG. 2, in addition to an A-species raw material supply system 100 to supply oxygen (raw material gas), there is included a B-species raw material supply system 200 to supply a specified amount of auxiliary raw material gas, such as a noble gas, which has a purity 99.99% or higher, does not contain nitrogen, and is for intensifying the emission intensity of discharge. Incidentally, although unavoidable $N_2$ is mixed even in the noble gas with a purity of 99.99% or higher as described above, it is desirable to use a noble gas in which the mixing of $N_2$ is smaller.

The B-species raw material supply system 200 includes a high purity argon cylinder 20, a pressure reducing valve 21, and an open/close valve 22, and supplies an auxiliary raw material gas 25b in a range of 500 ppm to 50000 ppm, specifically about 10000 ppm to an oxygen gas 17. A raw material gas 25 is supplied to an ozone generator 300 through a gas flow controller (MFC) 19 to control the gas quantity of the first raw material gas and a gas flow controller (MFC) 23 to adjust the gas quantity of the auxiliary raw material.

The ozone generator 300 includes electrodes 301a and 301b and a dielectric 302 at an opposite side of both the electrodes. A photocatalytic material with a band gap of 2.0 eV to 2.9 eV is applied to or sprayed on gas passage surfaces (wall surfaces of a discharge region=wall surfaces of a reaction space) of the dielectric 302 and the electrode 301b and is adhered thereto. In FIG. 1, the ozone generator 300 is supplied with the raw material gas 25 from the A-species raw material supply system, transforms it into an ozone gas 26, and outputs it to an outside 600 through an gas pressure controller (APC) 400.

Alternatively, in FIG. 2, the ozone generator 300 is supplied with the oxygen gas 17 from the A-species raw material supply system and a trace amount, about 500 ppm, of auxiliary gas 25b from the B-species raw material supply system, transforms it into an ozone gas 26, and outputs it to an outside 600 through an gas pressure controller (APC) 400. The auxiliary raw material gas as the noble gas such as argon, xenon or helium is for accelerating the ozone generation reaction by intensifying the emission intensity of discharge light.

The noble gas is made to be contained, so that the ozone generation reaction is accelerated. Although the photocatalytic material with a band gap of up to 3.1 eV can be used by the discharge light (ultraviolet light) of the noble gas, in the stability of ozone generation performance, a photocatalytic material of up to 2.9 eV is preferable.

An ozone power supply 500 to cause the ozone generator 300 to generate the ozone mainly includes a converter part 501, an inverter part 502, and a transformer part 503, applies a high AC voltage between the electrodes 301a and 301b of the ozone generator 300, and causes silent discharge (dielectric barrier discharge) between the electrodes through the dielectric.

In the discharge region with the gap interval of 0.1 mm as the reaction space, the high AC voltage is applied between the electrodes to cause the silent discharge, the oxygen gas of part of the raw material gas is dissociated into oxygen atoms by an interaction between the intense discharge light of a light wavelength of 428 to 620 nm and the photocatalyst applied to the discharge surface, the gas pressure of the reaction space is kept at a pressure of about 0.1 MPa to about 0.4 MPa (specifically, 0.1 MPa to 0.4 MPa), a bonding action of the dissociated oxygen atom and the other oxygen molecule is accelerated, and they can be transformed into a high concentration ozone gas. When the oxygen gas is dissociated into the oxygen atoms by the interaction between the discharge light and the photocatalyst applied to the discharge surface, in order to increase the amount of dissociation into the oxygen atoms, it is effective to increase the surface area of the applied photocatalyst.

Besides, as the gas temperature of the discharge becomes low, the light intensity of the discharge light is increased, and the dissociation into the oxygen atoms is accelerated. Thus, in the ozone generator 300, the electrode generating heat by the discharge is cooled. Although cooling means using water or the like is included for the cooling, the cooling means is omitted here in the illustration. Besides, although only one cell is shown in the illustrated discharge cell part, in an actual apparatus, the illustrated discharge cells are stacked in a multistage manner, gas passages are provided in parallel, and plural discharge cells are made to discharge.

The practice apparatus was of the type in which both electrodes could be cooled, the ozone generator 300 included a gap length (gap interval) of 0.1 mm and a discharge area of about 750 $cm^2$, a discharge power W of up to about 2000 W was injected from the ozone power supply, and as the raw material gas 25 injected into the ozone generator 300, the oxygen gas 17 with a purity of 99.99% or higher, or in addition to this, a noble gas such as argon was added from the auxiliary raw material gas cylinder 20. An ozone concentration characteristic was measured under the above condition.

Under the setting condition of the generator, as allowable performance estimation standards of the apparatus, the following design standards were determined.

Under a discharge power of 2 kW, and a raw material gas of 10 L/min, an ozone gas with an ozone concentration C of 200 $g/m^3$ (93333 ppm) or more can be extracted.

That is, as the ozone generation amount Y (g/h) under the above condition, the generation amount of 120 g/h or more can be obtained.

For that purpose, it is required that actually extracted ozone yield (g/kWh) is not smaller than a value set forth below.

$$X=(120 \text{ g/h})/(2 \text{ kW})=60 \text{ g/kWh}$$

When the ratio of an ozone yield X0 of the ozone generator itself to an actually extracted ozone yield X is made 50%, it is necessary that the ozone yield X0 of the ozone generator itself is 120 g/kWh or more.

For that purpose, ozone generation efficiency η (mg/J) is calculated as follows.

$$\eta=(120 \text{ g/kWh})/(60 \cdot 60 \text{ S})/1000=0.033 \text{ (mg/J)}$$

The ozone generation efficiency η of 0.033 mg/J or more is required.

This value is made an allowable reference of one apparatus, and is made a selection reference of the ozone generator system and the raw material gas.

Figure 20:
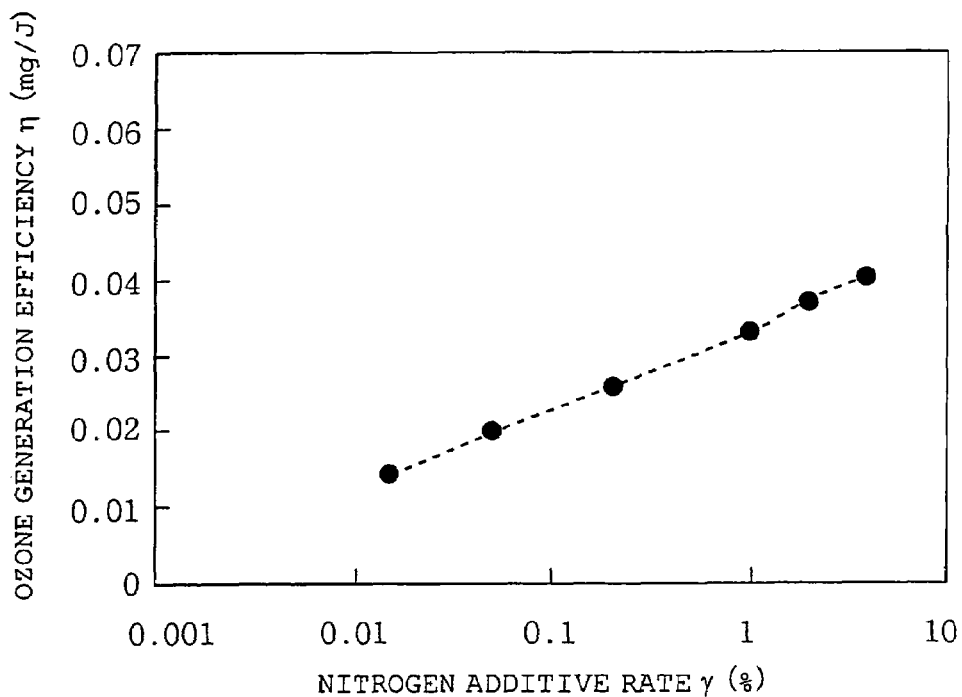
FIG. 20 is a graph showing, as a reference example, ozone generation efficiency η (mg/J) with respect to a nitrogen additive rate.
Figure 21:
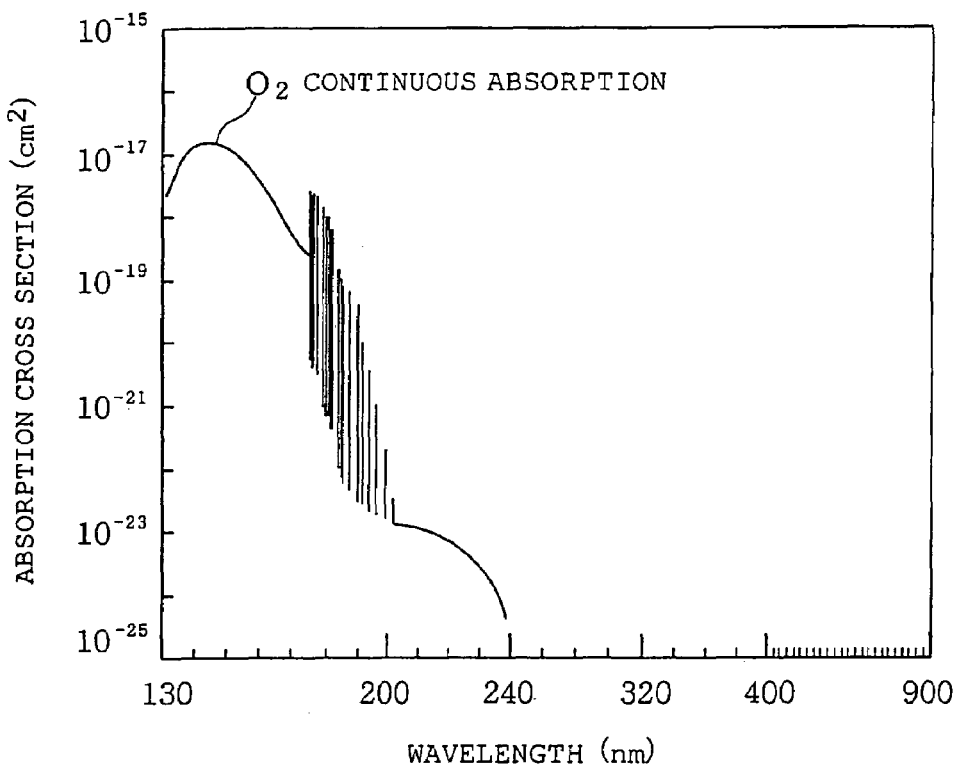
FIG. 21 is a graph showing a light wavelength and an energy absorption coefficient of an oxygen molecule in which an oxygen gas can be dissociated.

In the conventional ozone apparatus in which a nitrogen gas was added to an oxygen gas, in the condition in which the ozone generation efficiency η was 0.033 to 0.035 mg/J, it was required that the nitrogen additive rate γ was about 1.5% or more as shown in FIG. 20.

On the other hand, in the practice apparatus, only the high purity raw material gas to which the nitrogen gas was not added was supplied to the apparatus, and an ozone concentration characteristic indicated by a curved line connecting actually measured points in FIG. 3 was obtained. The ozone generation efficiency in this case is 0.039 mg/J, and it has been found that the ozone concentration comparable to or higher than the ozone concentration characteristic in the case where only nitrogen gas of 1% is added can be extracted.

Besides, it has been found that the ozone generation efficiency η is increased, and a high concentration ozone of 200 g/m³ or higher can be obtained.

As a result, since the nitrogen gas is not added to the raw material gas, the amount of generation of $NO_X$ such as $N_2O_5$ or NO as by-product by the discharge can be eliminated, the nitric acid ($HNO_3$) cluster by the bonding of $NO_X$ and moisture can be eliminated, and the amount of generation of a metal impurity by a stainless metal surface of an ozone outlet pipe or the like and nitric acid can be eliminated.

As a result of studying the practice apparatus, the chemical reaction process by the discharge of the raw material gas, the photochemical reaction of the wavelength of the discharge light by the discharge and the photocatalyst, and the like, it has been found that the ozone can be generated by the novel ozone generation mechanism. The photocatalytic material applied to the electrode surface absorbs the intense light of the discharge light, so that an electron is pumped from the valence band to the conduction band in the photocatalytic material, the photocatalytic material itself is brought into an excited state, and a positive hole (hole) is formed in the valence band of the excited photocatalytic material. When the excited photocatalyst comes in contact with the oxygen molecule, the dissociation action of the oxygen molecule is accelerated by the reaction (oxidation reaction of the oxygen molecule) between the electron of the oxygen molecule and the positive hole of the photocatalyst, and the ozone is generated by the acceleration of the bonding action of the dissociated oxygen atom and the oxygen molecule.

With respect to the ozone generation mechanism in the photocatalytic reaction function of the invention, the dissociation mechanism of the oxygen (molecule) gas is shown in FIG. 4, the ozone generation mechanism from the oxygen atom and the oxygen molecule is shown in FIG. 5, the mechanism from the oxygen gas to the ozone generation in the practice apparatus is shown in FIG. 6, and the operation and function in which the ozone is generated from the oxygen gas by the discharge will be described. At first, the oxygen molecule has a light absorption spectrum (ultraviolet wavelength of 130 to 200 nm) of a continuous spectrum at wavelengths of an ultraviolet light of 245 nm or less, the oxygen molecule is dissociated into oxygen atoms by absorbing excimer light of ultraviolet light of 245 nm or less, and the ozone is generated by triple collision (reaction equation R2) of the dissociated oxygen atom, the oxygen molecule, and a third material, which is known in an excimer lamp or the like to emit ultraviolet rays. However, in the silent discharge under a high pressure of 1 atmospheric pressure or higher in which the oxygen gas is the main as in the ozone generator, there is no light emission of the excimer light of ultraviolet light of 245 nm or less. Thus, the dissociation of the oxygen atom by the silent discharge light and the reaction process of the ozone generation are not conceivable.

FIG. 4 schematically shows an electronic configuration structure in a solid in a solid electron theory (band gap theory) of a photocatalyst in silent discharge and a dissociation mechanism of an oxygen molecule. The operation and action of the photocatalytic reaction function by the photocatalytic material and the discharge light will be described. When the photocatalyst is applied to the wall surface of the electrode or the like in the silent discharge space, as shown in FIG. 4, in the electronic configuration structure of the band gap of the photocatalyst, the silent discharge light having energy equal to or larger than the band gap is optically absorbed. Then, in the photocatalyst, an electron is jumped out from the valence band and is transferred (pumped) to the conduction band.

In the valence band from which the electron is transferred, the positive hole (hole) is formed. The electron transferred into the conduction band is transferred to the periphery, or electron emission to the discharge region is performed, and its lifetime is ended. That is, the life time of the electron transferred into the conduction band is very short and is several tens psec. Since the positive hole in the valence band continues to exist unless the electron transferred into the conduction band reruns by the recombination, the lifetime of the positive hole is as long as 200 to 300 nsec. When the photocatalyst in the excited state where the positive hole exists comes in quantum contact with the oxygen molecule, the shared electron of the oxygen molecule is stolen, and the oxygen molecule is physically dissociated (adsorption and dissociation phenomenon of oxygen by photocatalyst [oxidation reaction]).

The dissociation (oxidation) reaction equation of the oxygen molecule by the photocatalyst becomes as follows. In order to dissociate the oxygen gas, there are two following dissociation reactions.

[Chemical formula 1]

(1)

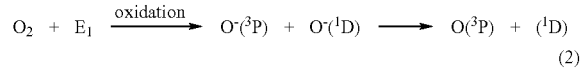
(2)

According to the material of the photocatalytic material, with respect to the energy level band, the band gap energy (of the forbidden band) between the valence band and the conduction band varies as shown in Table 2. The band gap energies of $SiO_2$, $Al_2O_3$, $TiO_2$ (anatase), $TiO_2$ (rutile), $WO_3$, $Fe_2O_3$, $Cr_2O_3$, $Cu_2O$, $In_2O_3$, $Fe_2TiO_3$, PbO, $V_2O_5$, $FeTiO_3$, $Bi_2O_3$, $Nb_2O_3$, $SrTiO_3$, ZnO, $BaTiO_3$, $CaTiO_3$, $SnO_2$ will be shown.

TABLE 2

| | Table 2-(a) | | | | |
|---|---|---|---|---|---|
| | quartz ($SiO_2$) | alumina ($Al_2O_3$) | $TiO_2$ (anatase) | $TiO_2$ (rutile) | tungsten oxide ($WO_3$) |
| energy gap | 7.8 eV | 7.0 eV | 3.2 eV | 3.0 eV | 2.8 eV |
| absorption wavelength of photocatalytic | 159 nm (vacuum ultraviolet) | 177 nm (vacuum ultraviolet) | 388 nm (ultraviolet) | 413 nm (visible) | 443 nm (visible) |

TABLE 2-continued effect

Table 2-(b)

|  | iron oxide (Fe$_2$O$_3$) | chromium oxide (Cr$_2$O$_3$) | Cu$_2$O | In$_2$O$_3$ | Fe$_2$TiO$_3$ |
|---|---|---|---|---|---|
| energy gap | 2.2 eV | 2.07 eV | 2.2 eV | 2.5 eV | <2.8 eV |
| absorption wavelength of photocatalytic effect | 564 nm (visible) | 600 nm (visible) | 564 nm (visible) | 496 nm (visible) | 443 nm (visible) |

Table 2-(c)

|  | PbO | V$_2$O$_5$ | FeTiO$_3$ | Bi$_2$O$_3$ | Nb$_2$O$_3$ |
|---|---|---|---|---|---|
| energy gap | 2.8 eV | 2.8 eV | 2.8 eV | 2.8 eV | 3.0 eV |
| absorption wavelength of photocatalytic effect | 443 nm (visible) | 443 nm (visible) | 443 nm (visible) | 443 nm (visible) | 413 nm (visible) |

Table 2-(d)

|  | SrTiO$_3$ | ZnO | BaTiO$_3$ | CaTiO$_3$ | SnO$_2$ |
|---|---|---|---|---|---|
| energy gap | 3.2 eV | <3.3 eV | 3.3 eV | 3.4 eV | 3.6 eV |
| absorption wavelength of photocatalytic effect | 388 nm (ultraviolet) | 376 nm (ultraviolet) | 376 nm (ultraviolet) | 365 nm (ultraviolet) | 344 nm (ultraviolet) |

In Table 2-(a) to Table 2-(d), the band gaps of alumina ceramic and quartz are 7.0 eV and 7.8 eV, and the light absorption wavelength to bring the material into the excited state by light is 177 nm or less or 159 nm or less in the vacuum ultraviolet light region. Thus, light of 177 nm and 159 nm can not be emitted by the silent discharge of the oxygen or the oxygen and argon gas. Thus, the silent discharge light can not optically excite alumina or quartz, and does not have the ability to dissociate the oxygen molecule.

Besides, in the photocatalyst with a band gap of 3.0 eV to 3.6 eV, since the optical absorption wavelength is ultraviolet light of 413 mm to 344 nm, the silent discharge containing nitrogen has the ability to emit (discharge) the light wavelength of the ultraviolet region. However, it has been found that in the silent discharge of the oxygen or the oxygen and argon gas, the ability to emit the light of the light wavelength of the ultraviolet region is low. In the silent discharge including nitrogen, the light catalyst with a band gap of 3.0 eV to 3.6 eV is optically excited, the excited photocatalyst has the ability to dissociate the oxygen molecule, and can generate the ozone gas.

Further, in the photocatalyst with a band gap of 2.0 eV to 2.9 eV, since the light absorption wavelength is visible light of 428 nm to 620 nm, the silent discharge of the oxygen not containing nitrogen or the oxygen and argon gas has the ability (discharge) to emit light of the optical wavelength in the visible light region. Thus, it has been found that when the photocatalyst with a band gap of 2.0 eV to 2.9 eV is applied to the electrode surface (wall surface) of the ozone generator, the photocatalyst absorbs the discharge light of the oxygen not containing nitrogen or the oxygen and argon gas and is excited, the oxygen can be dissociated by the adsorption and dissociation action of the excited photocatalyst and the oxygen gas. Further, it has been found that the ozone can be generated by the function that the bonding action is accelerated by the triple collision of the dissociated oxygen atom and the oxygen molecule.

Incidentally, here, the relation between the band gap energy {energy gap E(eV)} of the photocatalyst and the wavelength λ (nm) of the absorption light is as follows.

wavelength λ (nm) of absorption light≦1240/E(eV)
energy gap E (eV) wavelength (nm) of absorption light

| | |
|---|---|
| 3.6 | 344 |
| 3.5 | 354 |
| 3.4 | 365 |
| 3.3 | 376 |
| 3.2 | 388 |
| 3.1 | 400 |
| 3.0 | 413 |
| 2.9 | 428 |
| 2.8 | 443 |
| 2.7 | 459 |
| 2.6 | 477 |
| 2.5 | 496 |
| 2.4 | 517 |
| 2.3 | 539 |
| 2.2 | 564 |
| 2.1 | 590 |
| 2.0 | 620 |

Figure 7:
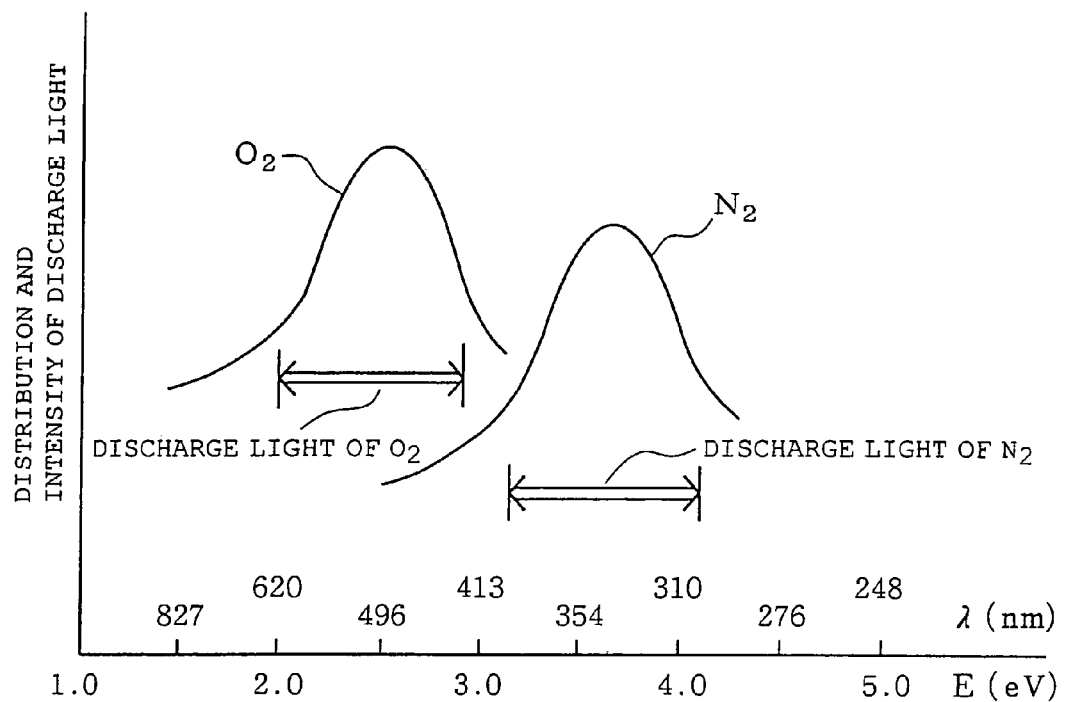
FIG. 7 is a view showing a distribution range and intensity of discharge light by nitrogen gas or oxygen gas with respect to an energy gap E (eV) and a wavelength λ (nm) of absorption light.

Besides, FIG. 7 shows the distribution range and intensity of discharge light by the nitrogen gas or oxygen gas with respect to the energy gap (eV) and the wavelength λ (nm) of absorption light.

From the above, it has been found that in the ozone generator system of this invention, when the material of the photocatalytic material is selected, among photocatalytic materials of metal oxide, one containing at least one material of Cu$_2$O, In$_2$O$_3$, Fe$_2$TiO$_3$, Fe$_2$O$_3$, Cr$_2$O$_3$, PbO, V$_2$O$_5$, FeTiO$_3$, WO$_3$ and Bi$_2$O$_3$ is excellent in light absorption of visible light (discharge light) of light absorption wavelength of 428 nm to 620 nm, and as a result, even if the nitrogen gas is not added, the ozone generation efficiency η is high, and high concentration ozone can be obtained.

Further, in addition to the photocatalytic materials of the metal oxide, also in photocatalytic materials made of rare-earth metal ion complexes of $Nb_{2m}P_4O_{6m+4}$, $W_{2m}P_4O_{6m+4}$, $Ta_{2m}P_4O_{6m+4}$, $In_{2m}P_4O_{4m+4}$, $BaTi_4O_9$, $MnTi_6O_{13}$, $TiO_aN_b F_c$, $SrTiO_aN_bF_c$ and $BaTiO_aN_bF_c$, and plural elements, light absorption of light (discharge light) in the light absorption wavelength range of 300 nm to 500 nm is excellent, and in the photocatalytic material like this, even if the nitrogen gas is not added, the ozone generation efficiency η is high, and the high concentration ozone can be obtained. Incidentally, m, a, b and c in the photocatalytic materials made of the rare-earth metal ion complexes and the plural elements denote the element number of the elements.

When the photocatalytic material of the metal oxide or the photocatalytic material made of the rare-earth metal ion complex is doped with a material, as an auxiliary catalyst, of Ru, Ni, Pt, $RuO_2$, $NiO_X$ or NiO, the excitation capacity of the photocatalyst is further accelerated, the increase (accumulation) effect of the lifetime of the positive hole is raised, the ozone generation efficiency is further raised, and the efficiency at which the ozone is obtained is increased.

Incidentally, when the material of the photocatalyst is optically excited by discharge, and the positive hole (hole) is formed in the valence band, not only the oxygen molecule is dissociated by the action that the positive hole absorbs the electron, but also the positive hole absorbs the electron of a negatively charged ion (for example, $O^{2-}$, $O_2^{2-}$) of a dissociated oxygen atom or an oxygen molecule during the discharge to transform it into the oxygen atom or the oxygen molecule. Thus, since the negative oxygen ion disappears, the impedance of the discharge is further raised, and it is possible to form a high electric field discharge field higher than a high electric field discharge field formed by short gap discharge. As a result, the intensity of the discharge light having higher energy is raised, and the ozone generation efficiency η is raised, and there is an effect that the high concentration ozone can be obtained.

FIG. 5 shows a mechanism in which ozone is generated by a bonding action of a dissociated oxygen atom and an oxygen molecule. At the bonding of the oxygen atom and the oxygen molecule, since energy transfer can not be effectively performed by simple collision of the oxygen atom and the oxygen molecule, the bonding action can not be effectively accelerated. In order to effectively accelerate the bonding action, as shown in FIG. 5, triple collision including a third material (M), such as a wall, for transfer of energy is required at the same time as the collision between the oxygen atom and the oxygen molecule.

$$O + O_2 + M \rightarrow O_3 + M \quad (3)$$

In order to effectively accelerate the triple collision as stated above, it is effective that the pressure of gas is raised, and the gas molecule density is placed in a high state. From experiments, it has been found that when the pressure of gas is made 0.1 MPa or higher, the triple collision is abruptly accelerated, and the ozone generation efficiency is raised. When the gas pressure in the reaction space becomes 0.1 MPa or lower, the reaction is remarkably lowered. As the gas pressure in the reaction space is raised, the discharge voltage is raised, and when it exceeds 0.4 MPa, effective discharge light can not be irradiated to the whole surface of the electrode, and this is unsuitable. The gas pressure in the reaction space is preferably in the range of about 0.2 MPa to about 0.3 MPa.

FIG. 6 is a schematic view showing a mechanism from an oxygen gas to ozone generation in the section of an ozone generator of the practice apparatus. A structure is such that two electrodes 301a and 301b, and dielectrics 302 are provided, and photocatalytic materials 303 are applied to the surfaces of the dielectrics. In this drawing, the dielectric 302 is provided on each of the opposite surfaces of both the electrodes 301a and 301b, and the photocatalysts 303 are respectively applied to the opposite surfaces of both the dielectrics 302. A discharge region (reaction space) between the two electrodes 301a and 301b has a gap interval of about 0.1 mm and is a very narrow slit space.

When an oxygen gas 25 as a raw material gas is supplied to the discharge region, and an AC voltage of approximately several kV is applied between the two electrodes 301a and 301b, uniform silent discharge occurs on the whole surface of the discharge region, and discharge light with very intense light intensity is emitted. When this intense discharge light is irradiated to the photocatalyst, as shown in FIG. 4, the photocatalyst is brought into an excited state, and a positive hole is produced in the valence band of the photocatalyst. By the contact between the excited state photocatalyst and the oxygen molecule, the photocatalyst deprives the oxygen molecule of the electron. Then, the oxygen molecule is adsorbed and dissociated, and two oxygen atoms are generated. The ozone is generated by the triple collision between the generated oxygen atom and the oxygen molecule. For the generated ozone, a gas is made to continuously flow, and an ozone 26 is extracted. With respect to the amount of ozone extracted at a specified flow rate, when the discharge input is increased, the light amount of the discharge light is increased, and the ozone concentration is increased.

Besides, we applies the photocatalyst with a band gap of 2.0 eV to 2.9 eV to the electrode surface (wall surface) of the ozone generator, and it was confirmed that as the surface resistance of the electrode surface became high, the ozone concentration was increased.

Thus, in the case where the surface resistance of the electrode surface was low, it was suspected that the silent discharge contributed to the ozone generation, and a possibility of ozone generation at an electrode surface as stated below was examined.

(1) Silent discharge was performed in state where a material had a very large band gap of about 7 eV and only electrode surface resistance was lowered, and ozone generation by high purity oxygen was examined. As a result, it was confirmed that ozone was hardly generated, and only several tens g/m³ was obtained.

(2) Besides, silent discharge was performed in a state where a material had a band gap of 3.4 eV and electrode surface resistance was lowered, and ozone generation by high purity oxygen was examined. As a result, it was confirmed that although ozone concentration became higher than that under the condition of (1), only 100 g/m³ was obtained.

(3) Further, when silent discharge was performed in a state where a material had a band gap of 3.4 eV and a nitrogen gas of 0.005% or more was added to high purity oxygen, it was confirmed that an ozone concentration of 200 g/m³ or higher was obtained, the ozone generation efficiency was raised as electrode surface resistance became low, and high concentration ozone was obtained.

From the above experiments (1) to (3), it was confirmed that ozone was not generated by the direct contribution of the electrode surface resistance to the discharge, and it was found that the high concentration ozone could not be generated unless the band gap of the material applied to the electrode surface was in a specified range (range in which a discharge light wavelength could be absorbed). It was found that there was such a fact that when a material having a band gap in a specified range was applied, the ozone generation efficiency was increased as the electrode surface resistance became small. Then, the relation between the electrode surface resistance and the ozone generation efficiency was physically examined, and it was found that the material applied to the electrode surface had a great influence, and there was no much relevancy.

Thus, when the electrode surface state at the time when the electrode surface resistance was small was examined in detail, it was found that the electrode surface state was a very rough state, and the electrode surface area was very large. That is, it was found that when the surface area of the photocatalyst was made large, the contact area between the photocatalyst and the discharge light was increased, the photocatalyst was effectively excited, the adsorption and dissociation (quantum efficiency) between the oxygen and the excited photocatalyst was increased, and the ozone concentration was increased.

Further, when the gas pressure in the discharge region is made 0.1 Mpa or more, the frequency of the triple collision between the dissociated oxygen atom and the oxygen molecule is increased, and the ozone concentration is increased.

Incidentally, when the discharge gap d is made a short gap of about 0.1 mm, the discharge electric field intensity is raised, and as a result, the discharge light with high energy is obtained, and light of a shorter wavelength can be emitted. Thus, the photocatalyst can be excited more efficiently, and the ozone concentration can also be raised. In experiments, as the gap was made short and the discharge gas temperature was made low, the light intensity of the discharge light at a light wavelength in a range of 428 nm to 620 nm by silent discharge was raised, the excitation of the photocatalyst with a band gap of 2.0 eV to 2.9 eV was resultantly accelerated, and the ozone generation efficiency was also raised at the same time as the acceleration of the dissociation of the oxygen atom.

However, although the gap is about 0.1 mm in the implemented apparatus, from experiments, when the gap exceeds about 0.6 mm, the light intensity of the silent discharge light becomes extremely weak, the excitation of the photocatalyst does not become sufficient, the dissociation of the oxygen gas becomes less, and there is shown a tendency that the ozone generation becomes less. In the experiment, it was confirmed that when the discharge gap was 0.6 mm or less, the ozone was generated, and ozone of 100 g/m$^3$ or more was obtained at allowable efficiency.

As stated above, in the ozone generator system of embodiment 1, there are effects that the high ozone efficiency comparable to or higher than that of the conventional ozone apparatus added with nitrogen is obtained by the raw material gas not containing nitrogen and mainly containing oxygen, the ozone gas (clean ozone) having high concentration and not containing by-product material such as $NO_X$ or containing an unavoidable amount thereof can be generated, the discharge electric power, discharge voltage, and current to obtain a specified ozone can be made less, the ozone generator and the ozone power supply become compact, and the running cost becomes low.

Embodiment 2

Figure 8:
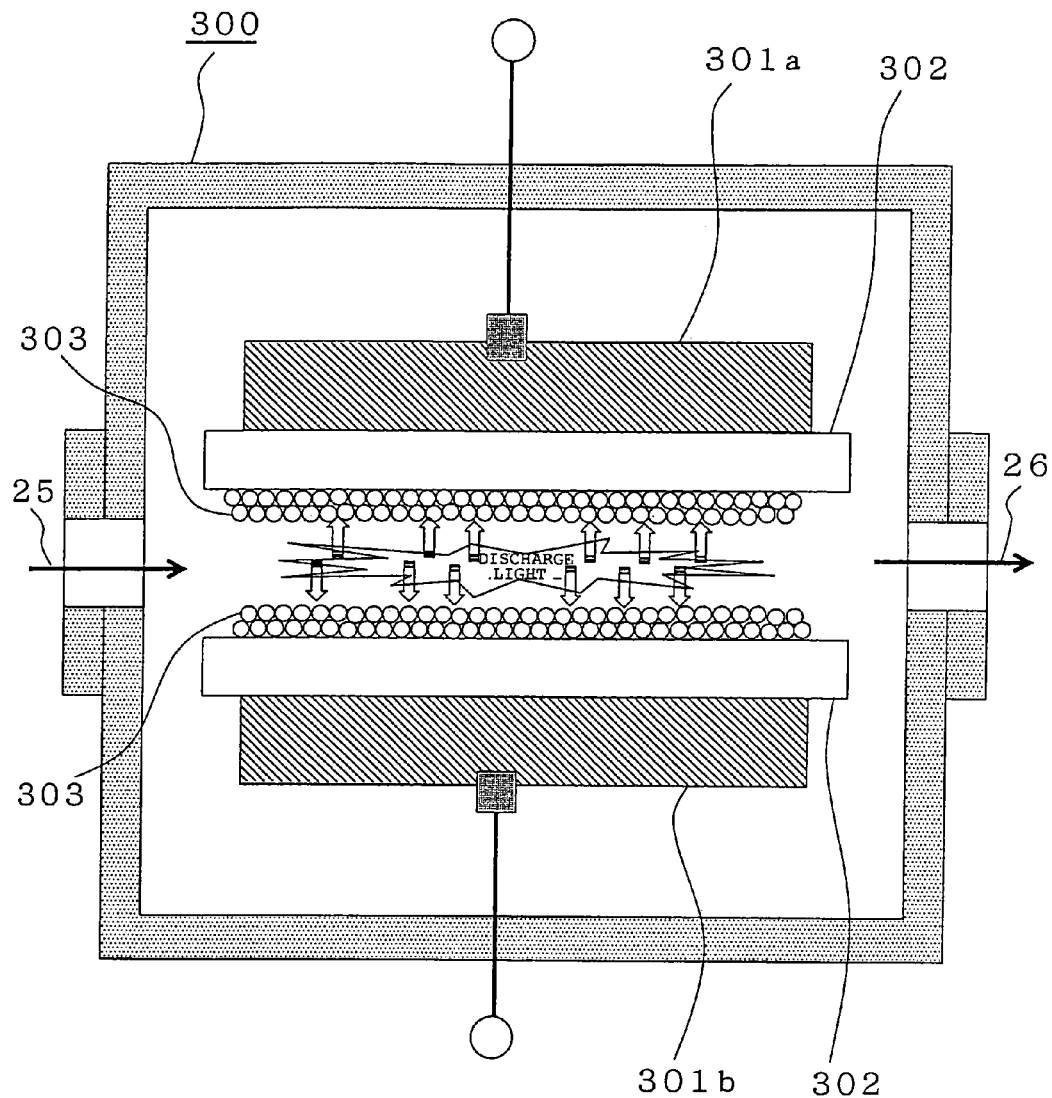
FIG. 8 is a sectional schematic view for explaining an ozone generator used in embodiment 2.

FIG. 8 is a sectional schematic view for explaining an ozone generator used in embodiment 2. In embodiment 2, with respect to structure and method other than a specific structure and method explained here, the same structure and method as the structure and method in embodiment 1 described before are provided, and the same function is obtained.

In embodiment 1, the mechanism in which ozone can be generated mainly by the discharge of the oxygen gas has been described. However, in order to cause the apparatus to actually generate high concentration ozone efficiently, in addition to the simple application of the photocatalytic material, it is indispensable that the surface area of the photocatalytic material in the case where the applied photocatalytic material is applied to the discharge surface is made as large as possible. As one of means for increasing the surface area on which the discharge light impinges, a photocatalyst 303 applied to or sprayed on the surface of a dielectric 302 is a powder, and the diameter of a powder particle is about 0.1 µm to several tens µm, specifically, 0.1 µm to 50 µm, and preferably several µm.

In FIG. 8, a raw material gas 25 not containing nitrogen and mainly containing oxygen is supplied to the ozone generator 300. The other structure is equal to that of FIG. 1 in embodiment 1.

Figure 9:
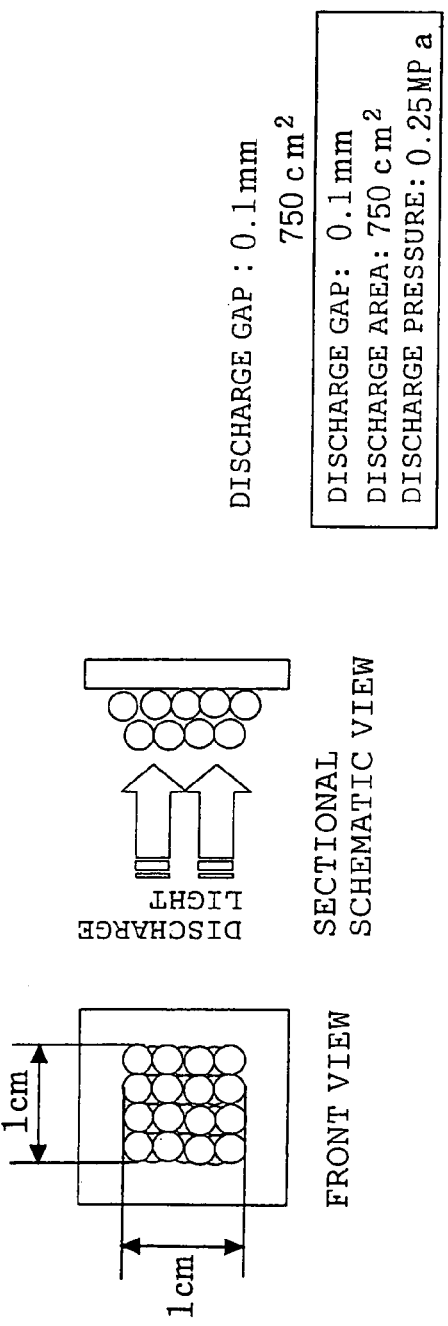
FIG. 9 is a schematic view showing a surface area per unit dielectric electrode area in which discharge light comes in contact with a photocatalyst in embodiment 2.

In embodiment 2, the photocatalytic powder (powder of the photocatalytic material of embodiment 1) of several µm is applied to or sprayed on the discharge surface side of the dielectric 302 (or the electrode 301), so that the contact surface area between the discharge light emitted in the discharge area and the photocatalytic particle can be increased. Thus, the dissociation action of the oxygen molecule by a photocatalytic material 303 is accelerated, the ozone is efficiently generated, and the high concentration ozone is generated. FIG. 9 is a view in which the contact surface area between the discharge light and the photocatalyst 303 powder in the case where the photocatalyst 303 powder is applied is calculated per unit dielectric electrode area. When the photocatalyst 303 powder is applied to the dielectric electrode surface of 1 cm$^2$, the surface area on which the discharge light impinges is increased to about 4.14 cm$^2$, and as shown in FIG. 8, when the photocatalytic powder is applied to both surfaces of the electrodes or the dielectrics, the surface area 8.26 times as large as the area of the actual discharge surface is obtained.

Figure 10:
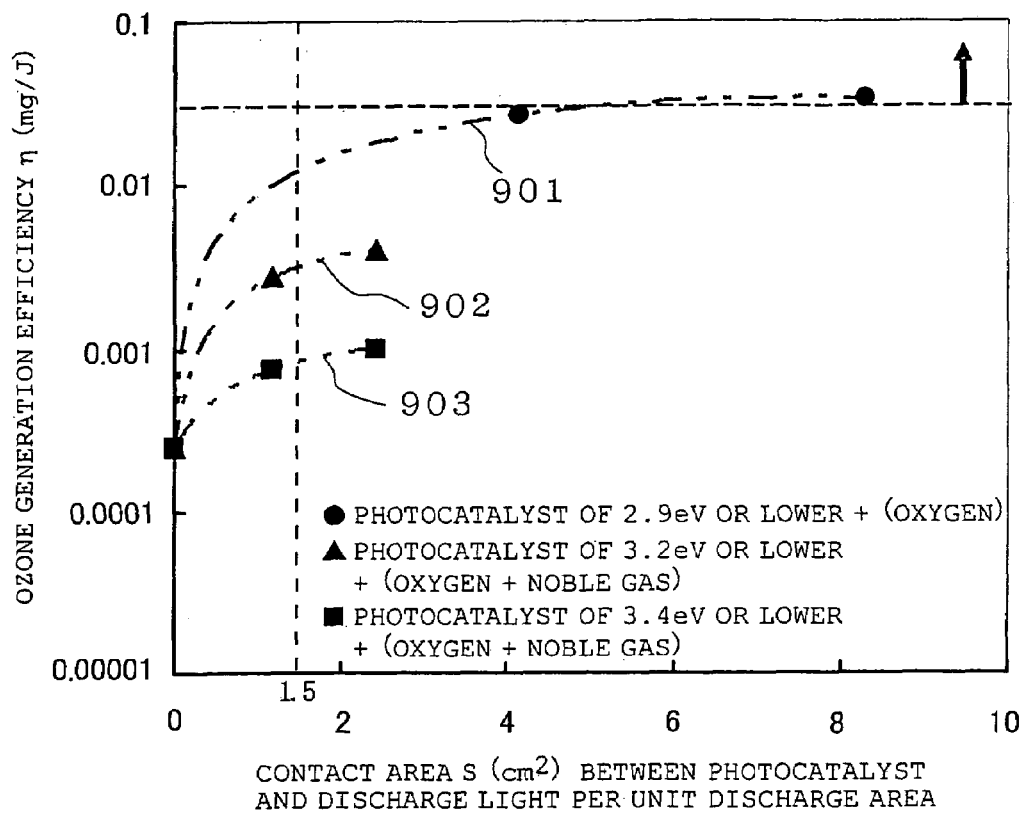
FIG. 10 is a graph showing characteristics of ozone generation efficiency with respect to a surface area of contact between discharge light and a photocatalyst per unit dielectric electrode area in embodiment 2.

In embodiment 2, the relation of the contact surface area S between the photocatalyst on the unit dielectric electrode surface and the discharge light with respect to the ozone generation efficiency η is as shown in FIG. 10. When the contact surface area S is increased, the ozone generation efficiency η is increased. As is understood from FIG. 10, it is apparent that as the contact area S becomes large, the reaction amount of the photocatalytic material is increased, and the ozone generation efficiency η is increased. From the characteristic of FIG. 10, an effective area $S_0$ is obtained in which the ozone concentration is increased with respect to the increase of the contact area S. That is, with respect to the ozone concentration obtained when the contact area S is increased, the contact area $S_0$ in which the increase of the ozone concentration up to about 80% is expected is about 1.5 times as large as the discharge area from the characteristic of FIG. 10, and when larger than this, the ozone generation efficiency η can be sufficiently ensured. Thus, when the contact surface area S between the photocatalytic material on the unit dielectric electrode surface and the discharge light is made 1.5 times or more, the ozone generation efficiency η can be sufficiently increased.

In FIG. 10, a characteristic 901 is a characteristic in a case where the photocatalyst has a band gap of 2.9 eV or less, and substantially the same characteristic is shown in the range of a band gap of 2.0 eV to 2.9 eV. A characteristic 902 is a characteristic in a case where the band gap of the photocatalyst is 3.2 eV or less, and a characteristic 903 is a characteristic in a case where the band gap of the photocatalyst is 3.4 eV or less.

As is understood from FIG. 10, in the silent discharge by the raw material gas added with no nitrogen gas, ozone generation can not be effectively performed in the photocatalytic material having a band gap exceeding 2.9 eV, and the result is such that even if the surface area of the photocatalyst is increased, sufficient ozone generation is not obtained.

As stated above, in embodiment 2, since the powder of the photocatalytic material having a particle diameter of 0.1 μm to 50 μm is adhered to the wall surface of the dielectric or the electrode in the discharge region, as compared with an actual electrode area, the surface area of the photocatalytic material on which the discharge light impinges is increased several-fold, and the discharge light can be made more to impinge on the photocatalyst. Thus, the action to dissociate the oxygen molecule into oxygen atoms by the contact between the activated photocatalytic material and the oxygen gas is accelerated, and the ozone generating efficiency can be appropriately more improved. As a result, the ozone generator system can be realized by the compact and inexpensive apparatus which can generate high concentration ozone.

Embodiment 3

Figure 11:
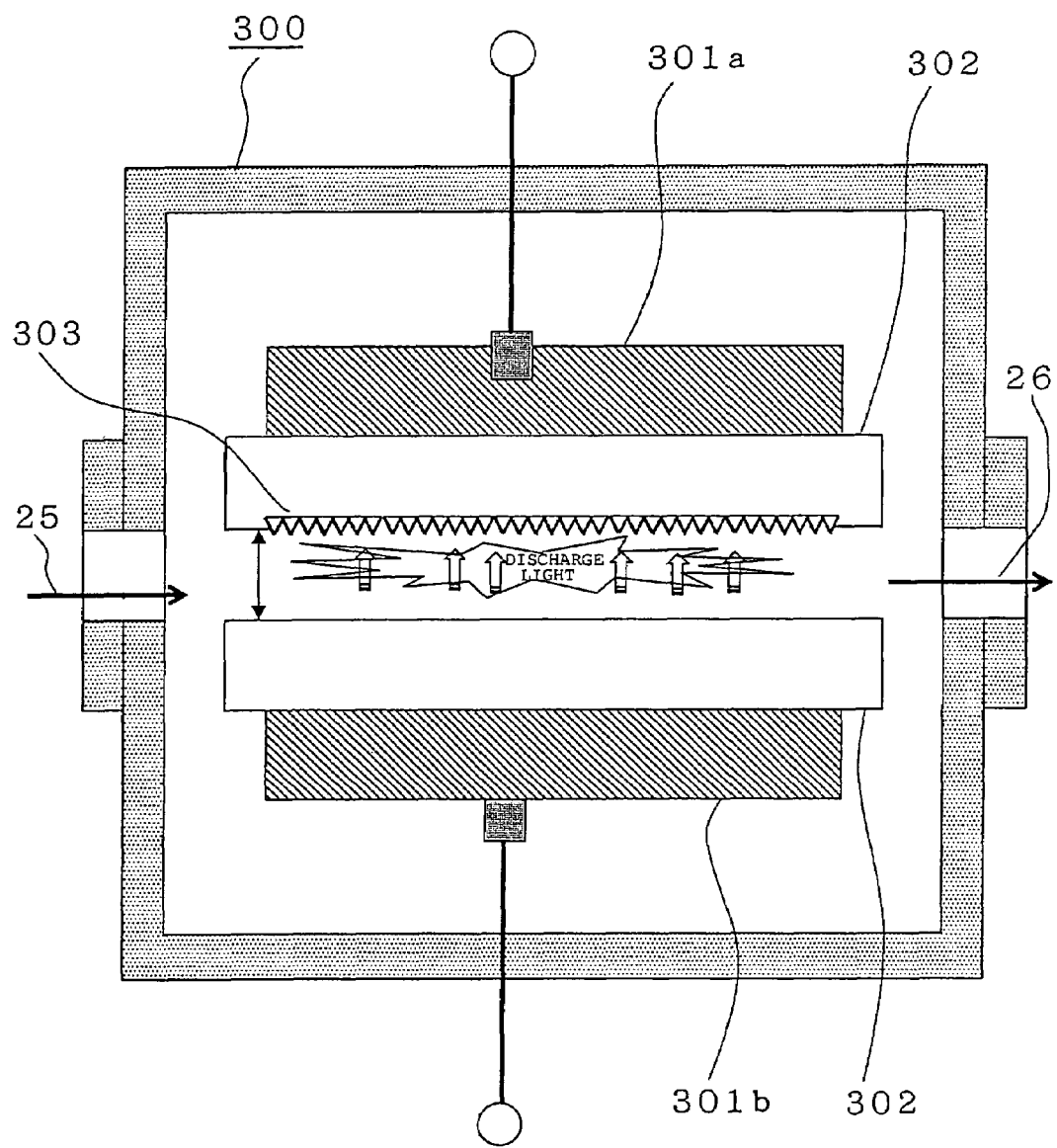
FIG. 11 is a sectional schematic view for explaining an ozone generator used in embodiment 3.

FIG. 11 is a sectional schematic view for explaining an ozone generator used in embodiment 3. In embodiment 3, with respect to structure and method other than a specific structure and method explained here, the same structure and method as the structure and method in embodiment 1 described before are provided, and the same function is obtained. A roughness of about 1 μm to several μm, specifically, 1 μm to 50 μm is formed on a dielectric electrode surface, and photocatalyst powder (powder particle diameter is about 0.1 μm to 50 μm) is applied to or sprayed on the dielectric electrode surface on which the roughness is formed.

In this embodiment 3, the discharge surface of a dielectric 302 (or an electrode 301) is made rough, and the photocatalytic material described in embodiment 1 is applied to or sprayed on the dielectric electrode surface on which the roughness is formed. Thus, the contact surface area between the discharge light emitted in the discharge region and the photocatalyst particle is increased, the dissociation action of an oxygen molecule is accelerated, ozone is efficiently generated, and the high concentration ozone is generated. In embodiment 3, the roughness is formed only on the dielectric at one side, and the photocatalytic material is applied. However, when the roughness is formed on both the dielectrics 302 and both the electrodes 301, higher concentration ozone is generated, and the ozone generation efficiency is increased.

As stated above, since the roughness of 1 μm to 50 μm is formed on the wall surface of the dielectric or the electrode in the discharge region, and the photocatalytic material is provided on the wall surface on which the roughness is formed. Thus, as compared with an actual electrode area, the surface area of the photocatalytic material is increased several-fold, and the discharge light can be made more to impinge on the photocatalyst. Thus, the action to dissociate the oxygen molecule into oxygen atoms by the contact between the activated photocatalytic material and the oxygen gas is accelerated, and the ozone generating efficiency can be appropriately more improved. As a result, the ozone generator system can be realized by the compact and inexpensive apparatus which can generate high concentration ozone.

Embodiment 4

Figure 12:
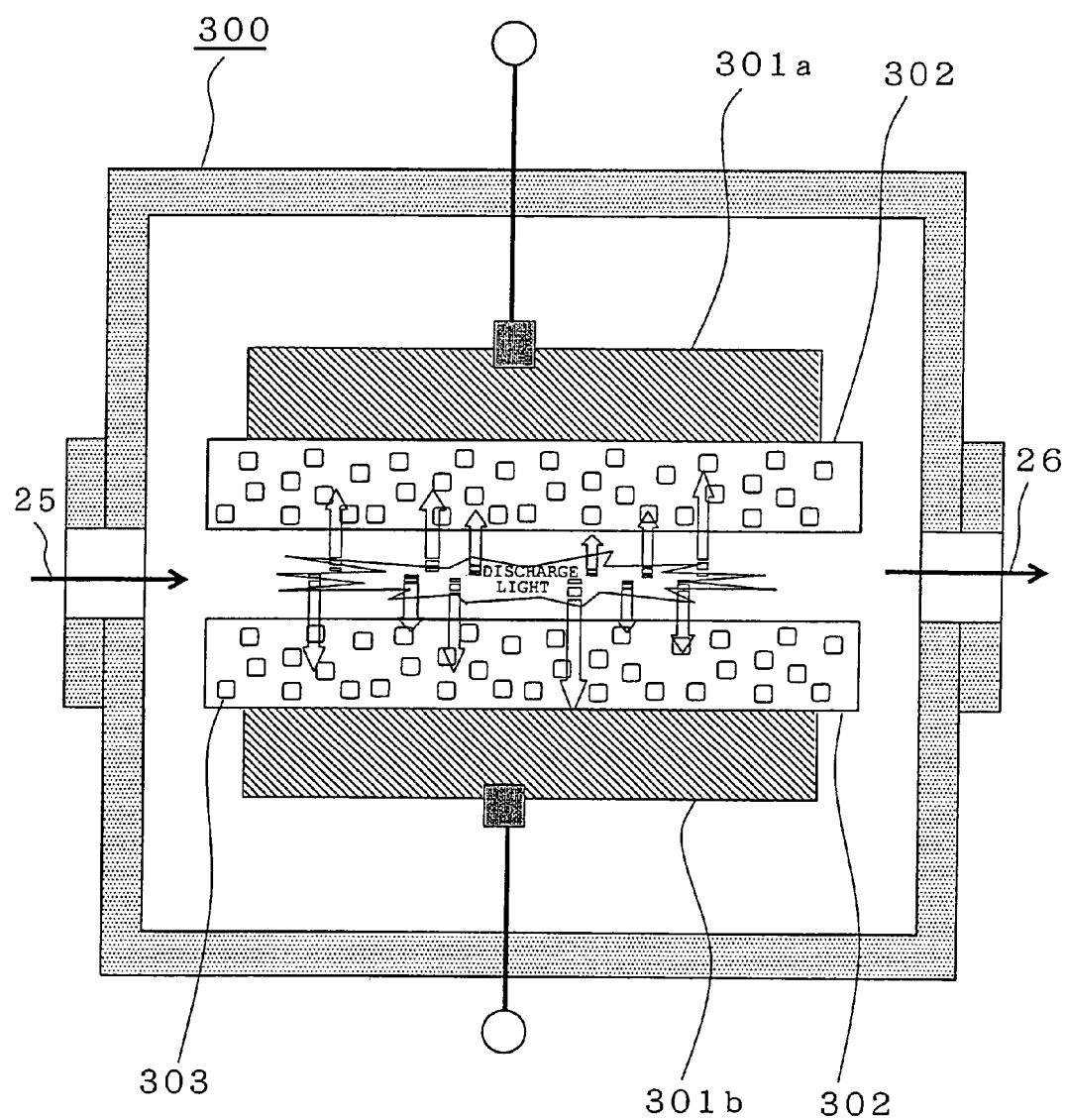
FIG. 12 is a sectional schematic view for explaining an ozone generator used in embodiment 4.

FIG. 12 is a sectional schematic view for explaining an ozone generator used in embodiment 4. In embodiment 4, with respect to structure and method other than a specific structure and method explained here, the same structure and method as the structure and method in embodiment 1 described before are provided, and the same function is obtained. In both dielectrics 302 made of ceramic and having a thickness of 0.725 mm, powder of the photocatalytic material of embodiment 1 (powder particle diameter is about 0.1 μm to 50 μm) is scattered and mixed at a volume ratio of about 1% to about 10%.

Figure 13:
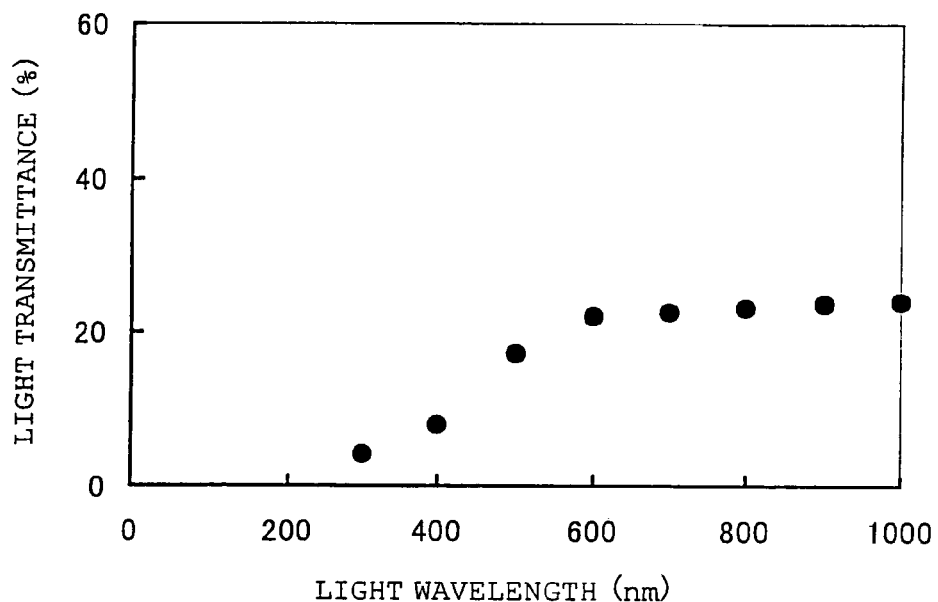
FIG. 13 is a graph showing a light transmittance characteristic of a ceramic plate with respect to a discharge light wavelength in embodiment 4.

FIG. 13 is a view showing a light transmittance characteristic with respect to a light wavelength in a case where the material of the dielectric 302 is made an alumina ceramic plate with a thickness of 0.725 mm. As is understood from FIG. 13, the dielectric 302 made of alumina ceramic is transparent to a light of 300 nm to 1000 nm emitted in the discharge region. It was experimentally confirmed that the photocatalyst was excited by the transmitted discharge light and the photocatalyst, the positive hole of the valence band of the excited photocatalyst and the oxygen molecule were adsorbed and dissociated through the dielectric 302, and ozone was generated.

Figure 14:
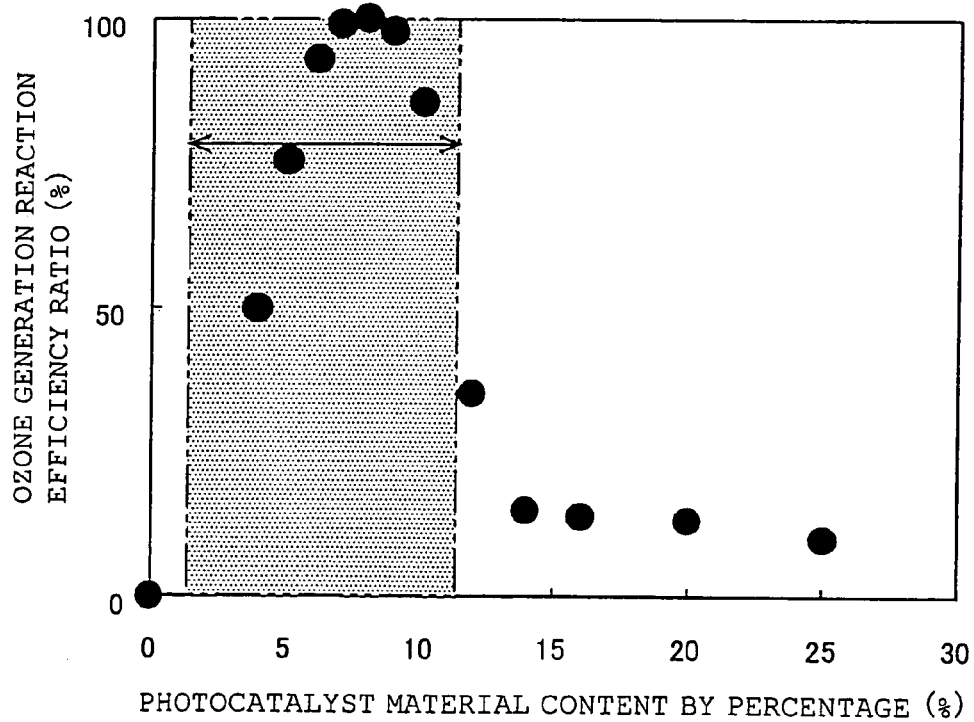
FIG. 14 is a graph of an ozone generation efficiency ratio with respect to a content ratio of photocatalyst contained in the ceramic plate in embodiment 4.

By using the transmission of this dielectric, the photocatalyst powder is scattered in the dielectric 302, and the surface area of the photocatalyst on which the discharge light impinges is increased. The positive hole of the valence band of the excited photocatalyst and the oxygen molecule are adsorbed and dissociated through the dielectric, and the ozone is generated. FIG. 14 is a view showing a result of an experimental study of a volume content ratio at which the photocatalyst is added to the dielectric 302 and an ozone generation efficiency ratio in embodiment 4. As a result, it was found that when the percentage content of the photocatalyst powder to the dielectric medium is about 1% to about 10% in volume ratio, the ozone generation efficiency is most increased. An interpretation can be made such that when the content ratio of the photocatalyst powder in the dielectric medium is made 10% or more, the discharge does not effectively impinge on the photocatalyst due to light scattering, and an apparent surface area on which the discharge light impinges becomes less, so that the ozone generation efficiency is decreased.

In embodiment 4, since the photocatalyst is not directly applied to the discharge surface, but is applied through the dielectric medium transparent to light, there is a merit that damage by the silent discharge is not given to the photocatalyst. As a result, there is an effect that the lifetime of the apparatus becomes long. Besides, since the surface area of the photocatalyst can also be made large, there is an effect that the ozone generation efficiency can also be made high. In embodiment 4, although the ceramic plate with a thickness of 0.725 mm is adopted as the dielectric 302 medium, when dielectric made of glass such as quartz is adopted, the discharge light can more easily pass through, and the photocatalyst can be effectively excited. As a result, the ozone efficiency is increased. Incidentally, it is more effective to apply embodiment 2 or embodiment 3 to the dielectric containing the photocatalytic material powder of embodiment 4.

As stated above, since the dielectric in the discharge region is made the dielectric through which the discharge light passes, and the photocatalyst powder of 1% to 10% at a volume ratio is made to be contained in the dielectric through which the discharge light passes. Thus, the surface area of the photocatalyst contained in the dielectric material, on which the discharge light impinges, is increased as compared with the actual electrode area, and the discharge light can be made more to impinge on the photocatalyst. Thus, the action to dissociate the oxygen molecule into the oxygen atoms by the contact between the activated photocatalyst and the oxygen gas is accelerated, and the ozone generating efficiency can be adequately more improved. As a result, the compact and inexpensive ozone generator system can be obtained, and the lifetime of the apparatus is prolonged.

Embodiment 5

Figure 15:
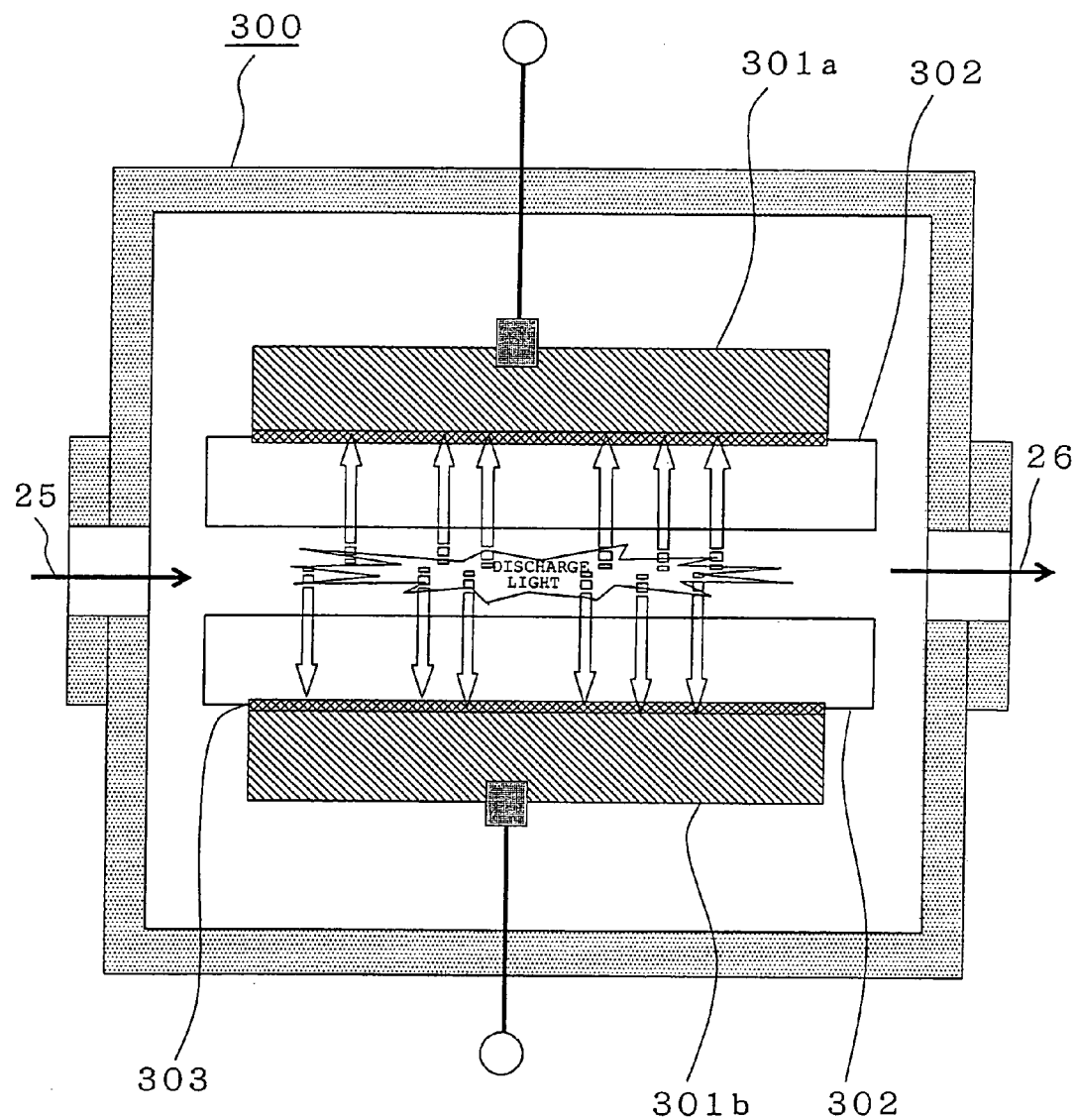
FIG. 15 is a sectional schematic view for explaining an ozone generator used in embodiment 5.

FIG. 15 is a sectional schematic view for explaining an ozone generator used in embodiment 5. In embodiment 5, with respect to structure and method other than a specific structure and method explained here, the same structure and method as the structure and method in embodiment 1 described before are provided, and the same function is obtained. A photocatalytic material of several tens nm is applied or sprayed between two electrodes 301a and 301b and both dielectrics 302 having a thickness of 0.725 mm and made of ceramic.

The dielectric 302 having a thickness of 0.725 mm and made of ceramic is transparent to a light of 300 nm to 1000 nm emitted in the discharge region as shown in FIG. 13. It was experimentally confirmed that the photocatalyst was excited by the transmitted discharge light and a photocatalyst 303, the positive hole of the valence band of the excited photocatalyst and the oxygen molecule were adsorbed and dissociated through the dielectric, and ozone was generated.

Figure 16:
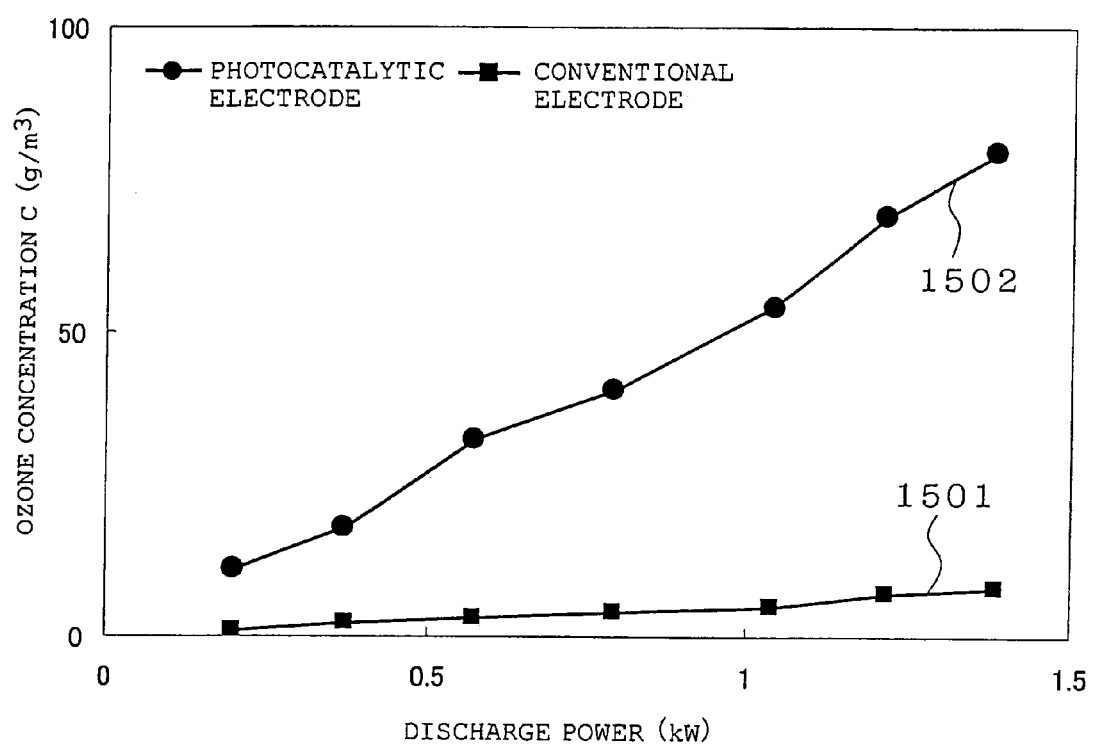
FIG. 16 is a view showing an ozone concentration characteristic with respect to discharge power in embodiment 5.

In embodiment 5, as compared with embodiments 1 to 3, although the ozone generation efficiency is low, it was confirmed that it became larger than the ozone generating quantity characteristic of the electrode to which the photocatalyst was not applied. FIG. 16 shows an ozone concentration characteristic (1502) in embodiment 5 and an ozone concentration characteristic (1501) of the conventional electrode. In embodiment 5, since the photocatalyst is not directly applied to the discharge surface, but is applied to the rear side of the dielectric medium through which light passes, there is a merit that damage due to silent discharge is not given to the photocatalyst. As a result, there is an effect that the lifetime of the apparatus becomes long.

In embodiment 5, although the ceramic plate with a thickness of 0.725 mm is adopted as the dielectric 302, when the dielectric made of glass such as quartz is adopted, the discharge light is more transmitted, and the photocatalyst can be effectively excited. As a result, the ozone efficiency can be increased. Incidentally, it is more effective to apply embodiment 2, 3 or 4 to the fixing of the photocatalyst covered with the dielectric in embodiment 5.

As stated above, since the photocatalytic material is provided on the electrode in the discharge region, and the discharge region side of the photocatalytic material is covered with the dielectric through which discharge light passes, it is possible to realize the ozone apparatus in which the lifetime is long, the ozone generation efficiency is increased, and high concentration ozone is obtained.

Embodiment 6

In the above respective embodiments, the description has been given to the method in which the oxygen gas added with no nitrogen gas or the oxygen gas added with the noble gas is made the raw material gas, ozone is made to be subjected to the generation reaction, and the clean ozone gas not containing the by-product material such as $NO_X$ is obtained. However, there is also a use in which even if a trace amount of by-product material such as $NO_X$ is contained, there is no problem. Thus, there is a case where even if a trace amount of by-product material such as $NO_X$ is contained, when the ozone generation efficiency is raised, that is preferable.

In embodiment 6, in the ozone generator systems of embodiments 1 to 5, a trace amount of nitrogen gas, specifically, the nitrogen gas of 10 ppm to 500 ppm is added to the oxygen gas or the gas mainly containing it. It was confirmed that the ozone generation reaction was accelerated, and the high concentration ozone increased by 5 to 10% was obtained. Besides, when the addition of the nitrogen gas is on this level, the production of a by-product material such as $NO_X$ does not become a problem.

In the silent discharge including nitrogen, the photocatalyst with a band gap of 3.0 eV to 3.6 eV can be optically excited, and the excited photocatalyst has the ability to dissociate the oxygen molecule and generates the ozone gas. As a result, by adding a trace amount of nitrogen (a suppressed amount of nitrogen), the allowable band gap range of the photocatalyst provided at the dielectric or the electrode in the discharge region can be expanded up to 2.0 eV to 3.6 eV, and the ozone generation reaction can be accelerated by using the discharge light (ultraviolet light) of nitrogen.

In the case of embodiment 6, although the photocatalyst containing the photocatalytic material with a band gap of 2.0 eV to 2.9 eV is desirably used, in addition to that, as the photocatalytic material of 2.0 eV to 3.6 eV, $TiO_2$ (anatase), $TiO_2$ (rutile), $Nb_2O_3$, $SrTiO_3$, $ZnO$, $BaTiO_3$, $CaTiO_3$ and $SnO_2$ shown in Table 2 can also be used.

Further, also in the case of embodiment 6, the relation of the contact surface area between the photocatalyst and the discharge light with respect to the ozone generation efficiency η is the same as the embodiment 2. Thus, it is effective to apply the photocatalytic material to the wall surface of the dielectric or the electrode in the discharge region, and to cause the contact surface area between the photocatalytic material and the discharge light to become 1.5 times or more as large as the area of the dielectric or the electrode.

Besides, it is effective that as a catalytic material, the powder of a photocatalytic material with a particle diameter of 0.1 μm to 50 μm is made to adhere to the wall surface of the dielectric or the electrode in the discharge region in order to increase the surface area.

Besides, it is also effective that a roughness of 1 μm to 50 μm is formed on the wall surface of the dielectric or the electrode in the discharge region, and the catalytic material is provided on the wall surface on which the roughness is formed to increase the surface area of the catalytic material.

Further, it is also effective that as the catalytic material, the dielectric in the discharge region is made the dielectric through which the discharge light passes, and the photocatalytic material powder of 1% to 10% in volume ratio is made to be contained in the dielectric through which the discharge light passes.

Incidentally, for comparison with an ozone generator system which does not use a photocatalyst, preceding reference examples will be described.

Figure 17:
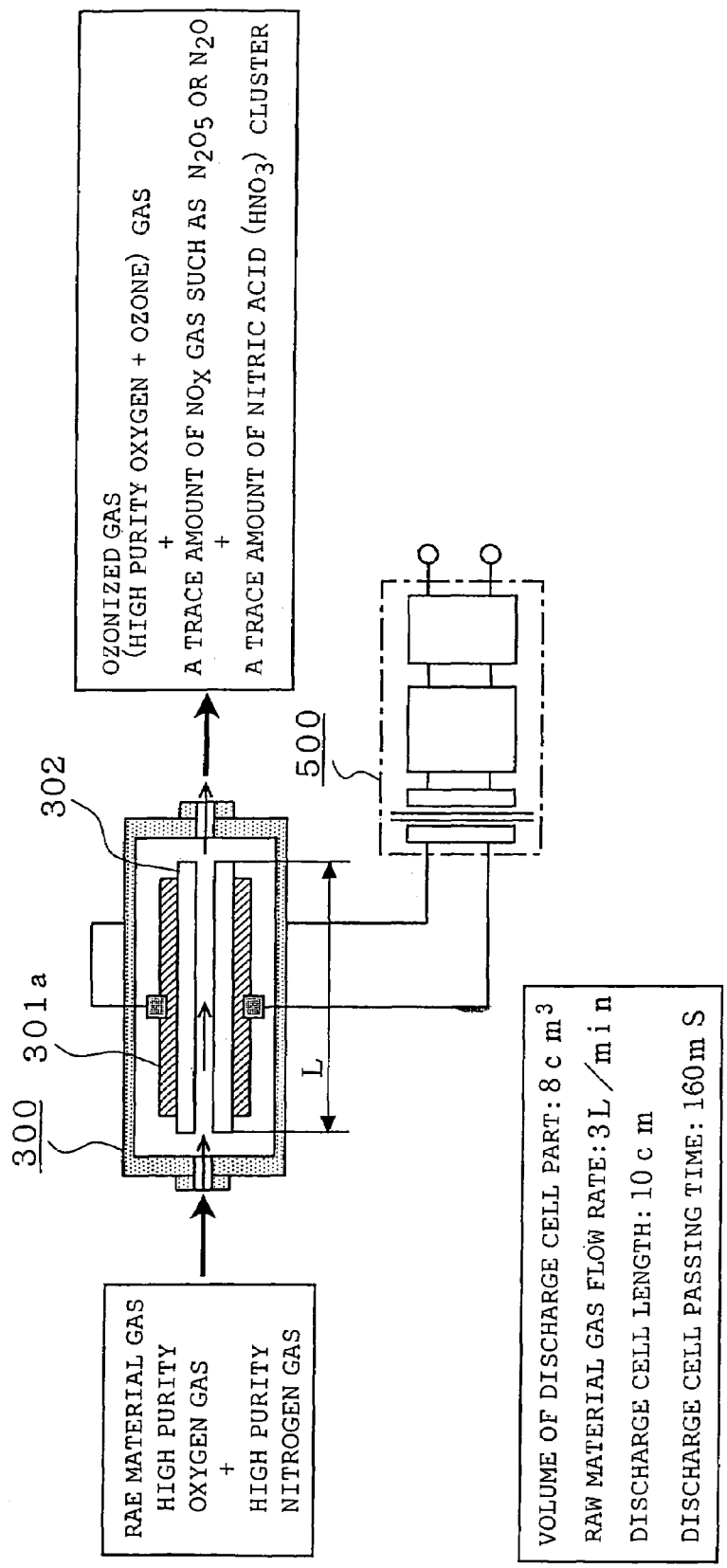
FIG. 17 is a structural view of an ozone generator shown as a reference example.

In the review, an ozone generator 300 shown in FIG. 17 was used which was of a type in which both surface electrodes 301 could be cooled, which used a discharge cell in which a gap length was 0.1 mm, a discharge area was about 750 cm$^2$, and a material of a dielectric 302 was alumina ($Al_2O_3$), and which had a structure in which a photocatalyst was not applied. A discharge electric power W of up to about 2000 W was injected from an ozone power supply 500, and an ozone concentration characteristic in a case where nitrogen was added to high purity oxygen was also completely examined through experiments.

In the structure in which the photocatalyst was not applied, measurement was made on the ozone concentration characteristic of 1) a case where nitrogen was added, 2) a case where only high purity oxygen was used, and 3) a case where noble gas was added to high purity oxygen. Examples of the result are shown in FIG. 18 and FIG. 19.

Figure 18:
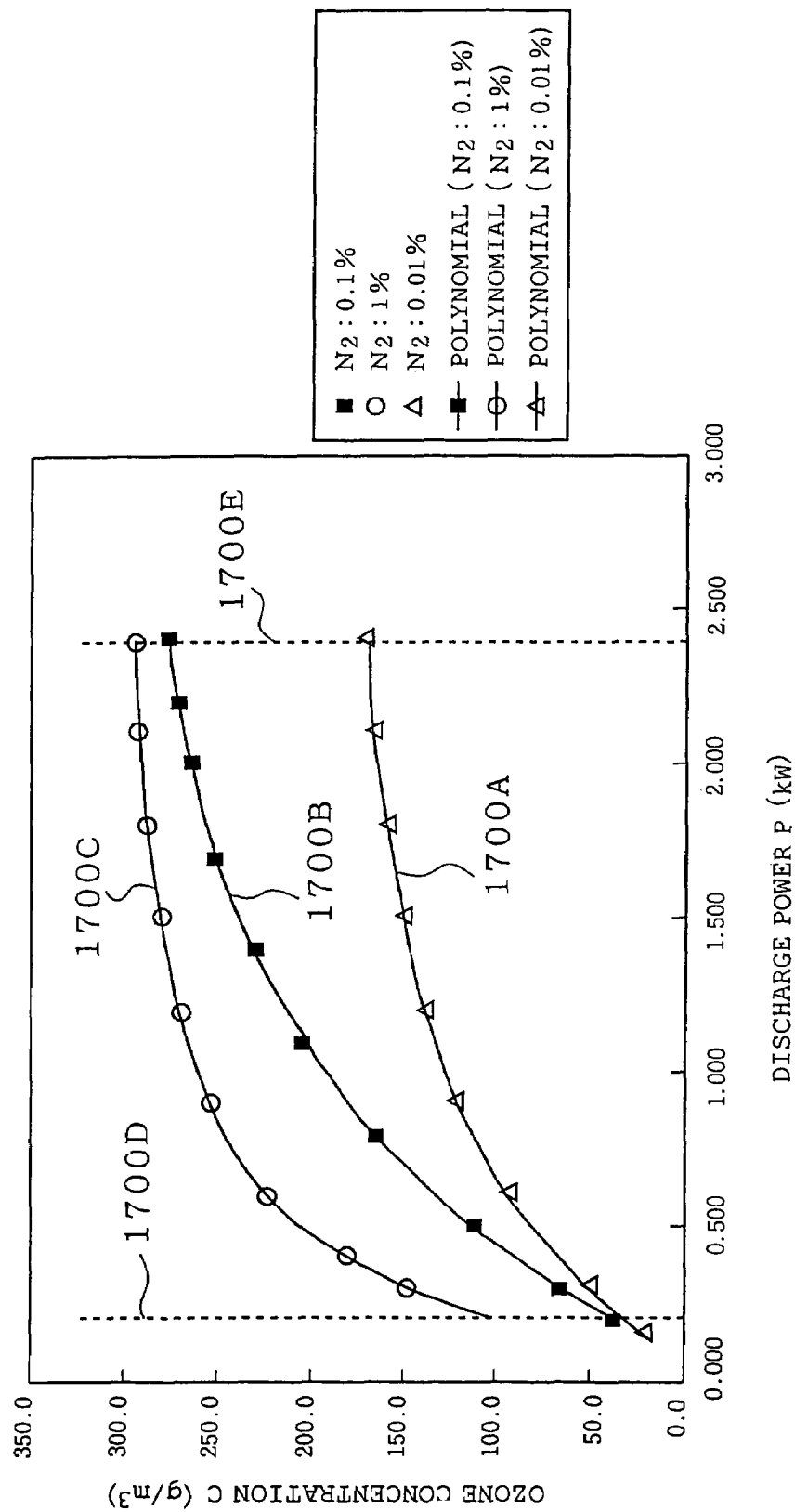
FIG. 18 is a graph showing, as a reference example, an ozone concentration characteristic in a case where a nitrogen gas is added to a high purity oxygen gas.

FIG. 18 shows ozone concentration characteristics with respect to the discharge electric power in a case 1700A where nitrogen is added at an additive rate of 0.01%, a case 1700B in which added at 0.1%, and a case 1700C where added at 1%. Besides, a broken line 1700D indicates a condition of a discharge power density of 0.25 W/cm$^2$ as low electric power density, and a broken line 1700E indicates a condition of a discharge power density of 3 W/cm$^2$ as high power density. (Incidentally, in the drawing, a unit SLM stands for standard L/min, and indicates L/m at 20° C.)

Figure 19:
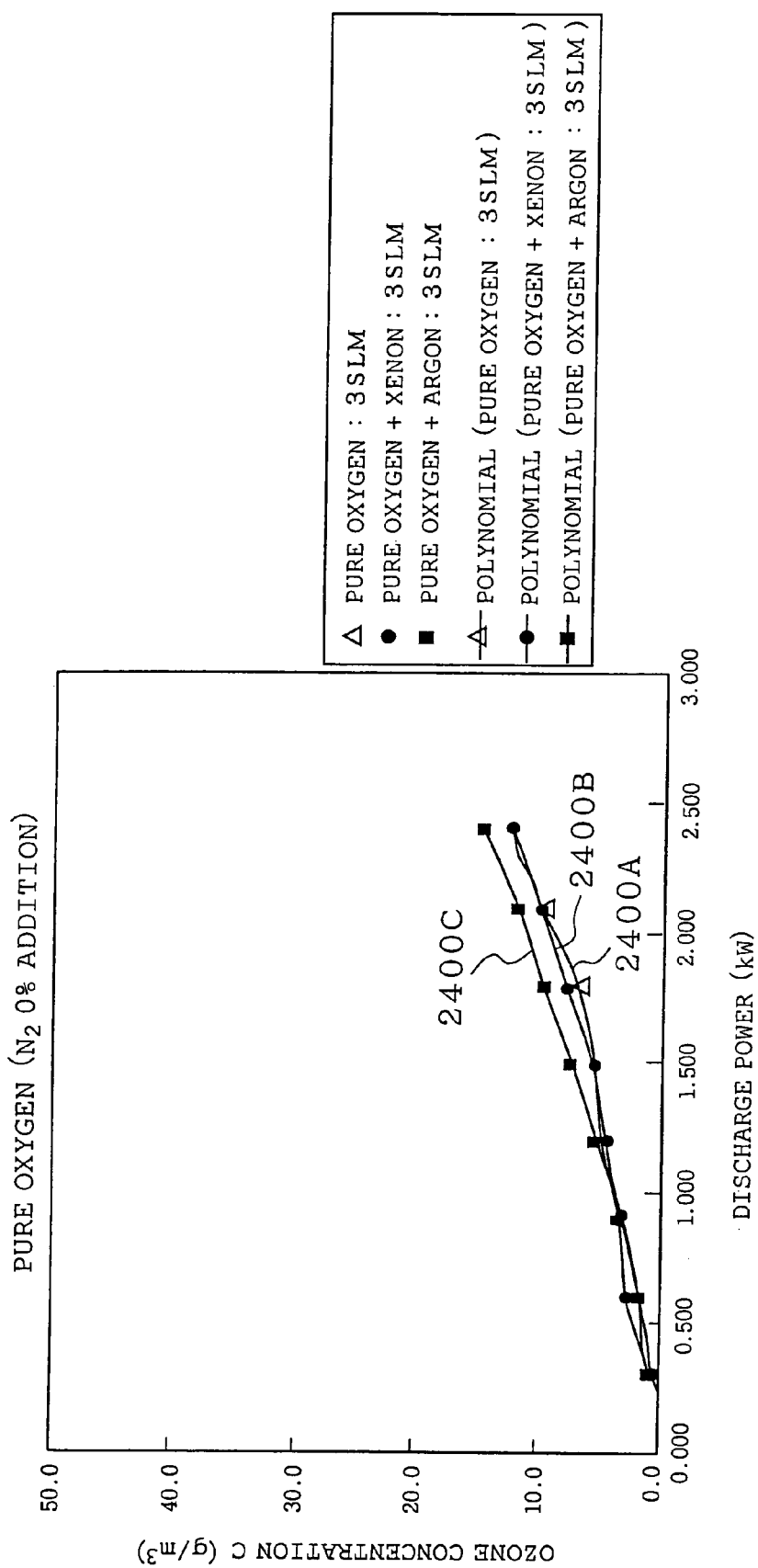
FIG. 19 is a graph showing, as a reference example, ozone concentration characteristics of a high purity oxygen gas when a photocatalytic material is not used and of a case where an auxiliary raw material gas such as a noble gas is added to the high purity oxygen.

FIG. 19 shows ozone concentration characteristics with respect to injection electric power in a case 2400A of only high purity oxygen gas, a case 2400C where argon gas is added, and a case 2400B where xenon gas is added. As compared with an ozone concentration of 290 g/m$^3$ at 2000 W obtained in FIG. 18, in FIG. 19, only an ozone concentration of 10 g/m$^3$ was obtained in any raw material gas, and there was little effect to raise the ozone concentration and the amount of generation by the addition of the single argon gas or xenon gas. Here, although the cases of the argon and xenon gases are shown, the same result was obtained for the addition of a noble gas such as helium or neon.

An experimental characteristic of a relation between the nitrogen additive rate y and the ozone generation efficiency η was obtained, and the result became as shown in FIG. 20, and its approximation became as follows:

approximation η=0.004310 g(γ)+0.033 [mg/J]

From this result, there was obtained a prodigious result that when the nitrogen additive rate γ was 0%, the ozone generation efficiency η was almost 0 mg/J.

From the series of results, it was found that a factor resulting from the ozone generation by nitrogen oxide was the generation of the oxygen atom by the dissociation acceleration action of the oxygen gas ($O_2$ molecule) itself by the photodissociation of the nitrogen oxide gas and the photocatalytic action of the nitrogen oxide.

Hereinafter, the results of the review on the ozone generation will be described in detail. In only the high purity oxygen and the addition of the single noble gas and the like, the ozone generation efficiency η was about 0 mg/J, and this result basically overthrew the ozone generation mechanism conventionally expressed by following reaction equations R1 and R2.

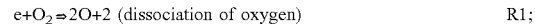

$$e+O_2 \Rightarrow 2O+2 \text{ (dissociation of oxygen)} \qquad R1;$$

$$O+O_2+M \Rightarrow O_3+M \qquad R2;$$

(ozone generation based on triple collision between oxygen atom and oxygen molecule)

From the result, we examined the relation between the nitrogen gas and ozone in detail, and the following inference was obtained.

- The dew point in the ozone generator is about −70° C. to −60° C., and moisture contained in the raw material gas is 3 ppm to 10 ppm.
- The wavelength of absorption light for dissociating the oxygen molecule is a continuous spectrum of ultraviolet rays of 130 to 245 nm, and the exciting light of the nitrogen gas is ultraviolet light of 300 to 400 nm and can not directly optically dissociate the oxygen molecule.
- A mechanism to generate the ozone gas by nitrogen additive rate is not conceivable except for the ultraviolet light of the exciting light of 300 to 400 nm of the nitrogen gas.

Thus, nitrogen compounds capable of dissociating the ozone atom by the ultraviolet light of 300 to 400 nm were examined. As a result, the after-mentioned (1) light emission of the ultraviolet light by discharge and ionization mechanism of water vapor $H_2O$ and a nitrogen molecule, and the conviction of (2) ozone generation mechanism by $NO_2$ were obtained. Besides, there are (3) a generation mechanism of nitric acid by $NO_2$ to suppress ozone generation, and (4) an ozone decomposition mechanism of generated ozone. The four mechanisms occur in the silent discharge region of the ozone generator, and the concentration of the extracted ozone is determined.

(1) Light emission of ultraviolet light by discharge and the ionization mechanism of water vapor $H_2O$ and nitrogen molecule

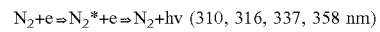

$$N_2+e \Rightarrow N_2^*+e \Rightarrow N_2+h\nu \text{ (310, 316, 337, 358 nm)}$$

N2*; excitation of nitrogen

Ultraviolet light by nitrogen gas

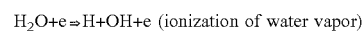

$$H_2O+e \Rightarrow H+OH+e \text{ (ionization of water vapor)}$$

$$N_2+e \Rightarrow 2N^-+e \text{ (ionization of nitrogen molecule)}$$

(2-1) Generation mechanism of ozone by thermal catalyst chemical reaction of $NO_2$

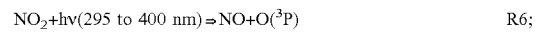

$$NO_2+h\nu(295 \text{ to } 400 \text{ nm}) \Rightarrow NO+O(^3P) \qquad R6;$$

$$H+O_2+M \Rightarrow HO_2+M \qquad R7;$$

$$HO_2+NO \Rightarrow OH+NO_2 \qquad R8;$$

$$O(^3O)+O_2+M \Rightarrow O_3+M \qquad R2;$$

The oxygen atom $O(^3P)$ is formed by nitrogen dioxide $NO_2$ and the ultraviolet light in the vicinity of 300 nm by excitation of nitrogen (reaction of R6), and ozone is generated by triple collision between the generated oxygen atom $O(^3P)$ and the oxygen molecule $O_2$ (reaction of R2). Nitrogen monoxide NO generated by the reaction of R6 reacts on $HO_2$ radical generated by the R7 reaction, and nitrogen dioxide $NO_2$ is reproduced (reaction of R8).

That is, during the time when the raw material gas passes through the silent discharge region, nitrogen dioxide $NO_2$ repeats the reaction cycle of R6→R7→R8→R6 and is reproduced.

Besides, the oxygen atom $O(^3P)$ simultaneously generated during the time of passing through the silent discharge region makes the triple collision (R2) with the oxygen molecule, and the ozone gas is generated.

(2-2) Generation mechanism of ozone by photocatalyst reaction of $NO_2$ $$NO_2 + h\nu(295 \text{ to } 400 \text{ nm}) \Rightarrow NO_2^* \qquad \text{H1};$$

$$NO_2^* + O_2 \Rightarrow 2O(^3P) + NO_2 \qquad \text{H2};$$

$$2O(^3P) + 2O_2 + M \Rightarrow 2O_3 + M \qquad \text{R2};$$

Nitrogen dioxide $NO_2$ is brought into an excited state $NO_2^*$ by the nitrogen dioxide $NO_2$ and the ultraviolet light in the vicinity of 300 nm by the discharge light of argon or the like or the discharge light of nitrogen (reaction of H1). The excited $NO_2^*$ gives energy corresponding to the dissociation energy of the oxygen molecule to the oxygen molecule to dissociate it into the oxygen atom $(^3P)$, and the nitrogen dioxide itself returns to $NO_2$ of the base state.

The generated oxygen atom $O(^3P)$ makes a triple collision with the oxygen molecule $O_2$ and ozone is generated (reaction of R2). $NO_2$ in the base state is again brought into the excited state $NO_2^*$ by the ultraviolet light in the vicinity of 300 nm by the discharge light.

That is, during the time when the raw material gas passes through the silent discharge region, nitrogen dioxide $NO_2$ repeats the reaction cycle of H1→H2→H1 and is reproduced.

Besides, the oxygen atom $O(^3P)$ generated simultaneously during the time of passing through the silent discharge region makes a triple collision (reaction of R2) with the oxygen molecule and the ozone gas is generated.

(3) Generation mechanism of nitric acid by $NO_2$ $$OH + NO_2 + M \Rightarrow HNO_3 + M \qquad \text{R9};$$

The nitrogen dioxide $NO_2$ generates ozone, and at the same time, nitric acid $HNO_3$ is also generated (reaction of R9), the generation of an oxygen atom is suppressed, and the generation efficiency η of ozone is lowered.

(4) Mechanism of ozone decomposition $$e + O_3 \Rightarrow O + O_2 + e \text{ (electron collision decomposition)} \qquad \text{R3};$$

$$O_3 + \text{heat } T \Rightarrow + O + O_2 \text{ (heat decomposition)} \qquad \text{R4};$$

$$O_3 + N \Rightarrow O_2 + N1 \text{ (decomposition of ozone by impurity)} \qquad \text{R5};$$

The ozone generated by the reaction of R2 is decomposed by the electron collision in the silent discharge region (reaction of R3), decomposed by the heat (reaction of R4), and decomposed by the impurity such as moisture or $NO_X$ (reaction of R5).

Thus, the ozone extracted from the generator has a saturated characteristic as compared with the ozone generation efficiency η.

concentration of ozone extracted=(ozone generation amount)−(ozone decomposition amount)=(R2−R9)−(R3+R4+R5)

Although the R3 reaction is linearly increased with respect to the injection power of the silent discharge, the reactions of R9, R4 and R5 are increased in a ramp function by the increase of the injection power, and as a result, the high concentration ozone gas can not to be extracted.

In order to raise the concentration of the extracted ozone, as means for suppressing R3 and R4, it has been already proposed to raise the concentration of the extracted ozone by making the discharge gap length in the generator a short gap (0.1 mm or less) or by cooling the electrode surface.

Further, in our ozone generating test, it has been found that a conventional thought that high concentration ozone can be extracted by suppressing the reactions R3 and R4 to decompose the generated ozone, is inconsistent with experimental facts.

That is, it has been found that when the discharge gap length (gap interval) in the generator is made a short gap and the electrode surface is cooled, the discharge impedance of the silent discharge is raised, the electric field of the discharge space is raised, and the light intensity of the light hv (295 to 400 nm) is raised, and as a result, the effect that the ozone generation efficiency is raised is high, and the suppression effect of the reactions R3 and R4 is low.

Also with respect to the characteristic that the ozone concentration characteristic is saturated when the discharge power is inputted, it has been clarified that when the discharge power is inputted, the gas temperature in the discharge space is raised, so that the ozone generation efficiency is weakened by the lowering of the discharge impedance of the silent discharge rather than the decomposition of the ozone, and as a result, the ozone concentration characteristic is saturated.

The average gas temperature in the discharge space is merely increased by several degrees with respect to the electrode cooling temperature (20° C.) in the short gap space such as the gap length of 0.1 mm, and it has been found to be unthinkable that the ozone decomposition of the generated ozone of 10% or more is made by the gas temperature in the state where the average gas temperature is 30° C. or lower. However, when the ozone concentration becomes 250 g/m$^3$ or more, natural decomposition dependent on the temperature is slightly increased from the relation of equilibrium of an existence ratio of oxygen and ozone.

Besides, with respect to means for suppressing R5 in order to raise the concentration of the extracted ozone, it is already a clear fact to use a raw material gas having high purity and having a good raw material gas dew point (−50° C. or lower).

In the examination results of the reference examples, the nitrogen gas or the $NO_2$ gas generated from the nitrogen gas contributes to the ozone generation, and when only high purity oxygen is used (photocatalytic material is not used) and unless the nitrogen gas is added, ozone can not be generated.

This invention is not different from, as a conventional explanation of an ozone generation-mechanism by discharge, an explanation based on the electron energy distribution (Boltzmann distribution) by the Boltzmann equation in the thermodynamics of discharge. That is, in the conventional explanation, although it is interpreted that the electron energy of the discharge directly collides with the oxygen and decomposes the oxygen, the photocatalytic material is excited by the wavelength of light and the energy instead of the electron, and the dissociation into the oxygen atoms is made by the reaction (oxidation reaction) to deprive the oxygen molecule of the electron by the force of the excited photocatalytic material, and this is not different from a remark in discharge that electron energy in the Boltzmann distribution is required.

Embodiment 7

In the ozone generator system of embodiment 1, the high ozone efficiency is obtained by the raw material gas not containing nitrogen and mainly containing oxygen, the clean ozone gas (nitrogen-free ozone gas) having high concentration and not containing by-product material such as $NO_X$ can be generated, the discharge power, discharge voltage, and current to obtain the specified ozone can be made small, the ozone generator and the ozone power supply become compact, and the running cost becomes low.

Thus, when this ozone generator system is used for a chemical vapor deposition apparatus, an ALD thin film deposition apparatus, an ozone condensing apparatus, or a pulp bleaching apparatus, various effects are obtained.

In a CVD apparatus or an ALD thin film deposition apparatus used for a semiconductor manufacturing apparatus for manufacturing a nonvolatile memory ferroelectric thin film, a high dielectric constant dielectric thin film, a nitride metal thin film, an oxide metal, an optical material thin film, a high density photomagnetic recording thin film, and a high quality capacitor thin film, a flat panel manufacturing apparatus, and a solar panel manufacturing apparatus, the nitrogen-free ozone gas is formed, so that a carbon compound, moisture or hydrogen adsorbed on a material to be processed, that is, an impurity material is oxidized and vaporized by the specific high thermodynamic oxidation capacity of the ozone gas itself and cleaning can be performed.

Besides, in a CVD apparatus or an ALD thin film deposition apparatus for producing a semiconductor chip, a flat panel, a solar panel, a superconducting thin film, and a magnetic storage tape, the nitrogen-free ozone gas is formed, so that a carbon compound, moisture or hydrogen adsorbed on a material to be processed, that is, an impurity material is oxidized and vaporized by the specific high thermodynamic oxidation capacity of the ozone gas itself and cleaning can be performed.

Since the deposited thin film is subjected to oxidation reaction on the atomic layer level by the nitrogen-free ozone gas, an insulating thin film having an excellent insulating property, a semiconductor thin film having a small leak current, an insulating film, or a dielectric can be formed, and it becomes possible to form a metal oxide thin film with very excellent quality.

Besides, in the nitrogen-free ozone gas, $NO_X$ or the like hardly exists in the ozone gas. Thus, not to mention the $NO_X$ impurity, a metal deposited by metal corrosion of an apparatus or a pipe part by the $NO_X$ impurity or a nitric acid cluster, and an impurity concentration in gas atmosphere for forming a thin film can be made extremely low. As a result, the nitrogen-free ozone gas acts on only the oxidation reaction of each thin film itself, and provides an important role in improvement of function and quality of the formed thin film.

Figure 24:
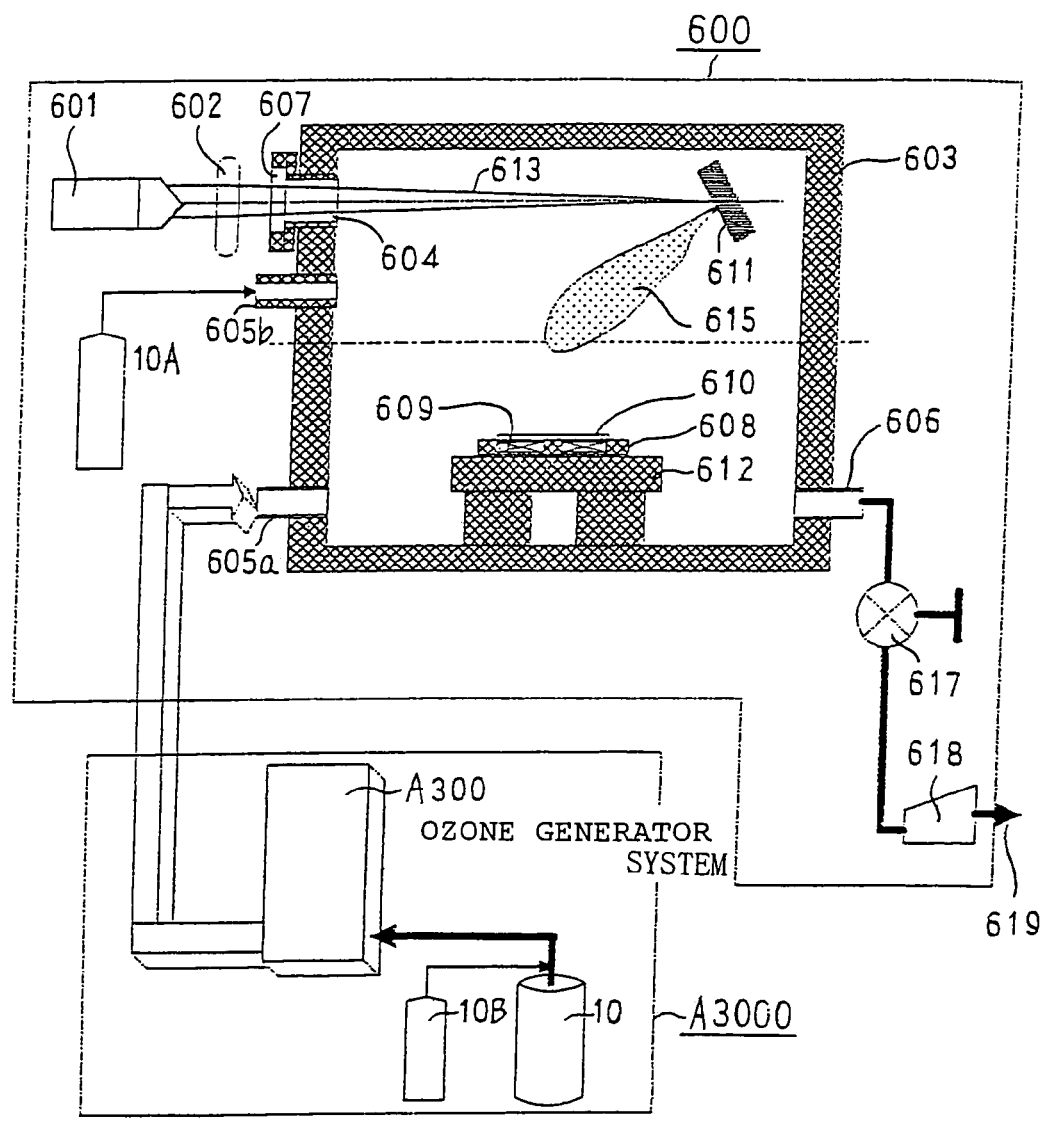
FIG. 24 is a structural view showing a CVD apparatus or an ALD thin film deposition apparatus for causing a metal thin film to be subjected to chemical reaction into an oxide metal thin film by a method of depositing a metal thin film by conventional laser ablation and an ozone gas.

In embodiment 7, although the CVD apparatus or the ALD thin film deposition apparatus by the laser ablation system shown in FIG. 24 has been described, the CVD apparatus or the ALD thin film deposition apparatus by electron beam ablation of an electron beam apparatus also has the same effect.

Further, although the CVD apparatus or the ALD thin film apparatus to form a thin film by releasing a metal vapor has been described, also in the CVD apparatus or the ALD thin film deposition apparatus in which a metal compound liquid having a low melting point is supplied like a shower into a chamber, the metal compound is evaporated and is made to adhere to a processed body, and a thin film is formed by causing an oxidation reaction to be performed by ozone gas, the nitrogen-free ozone gas is effective in forming the thin film with high quality.

Embodiment 8

Figure 22:
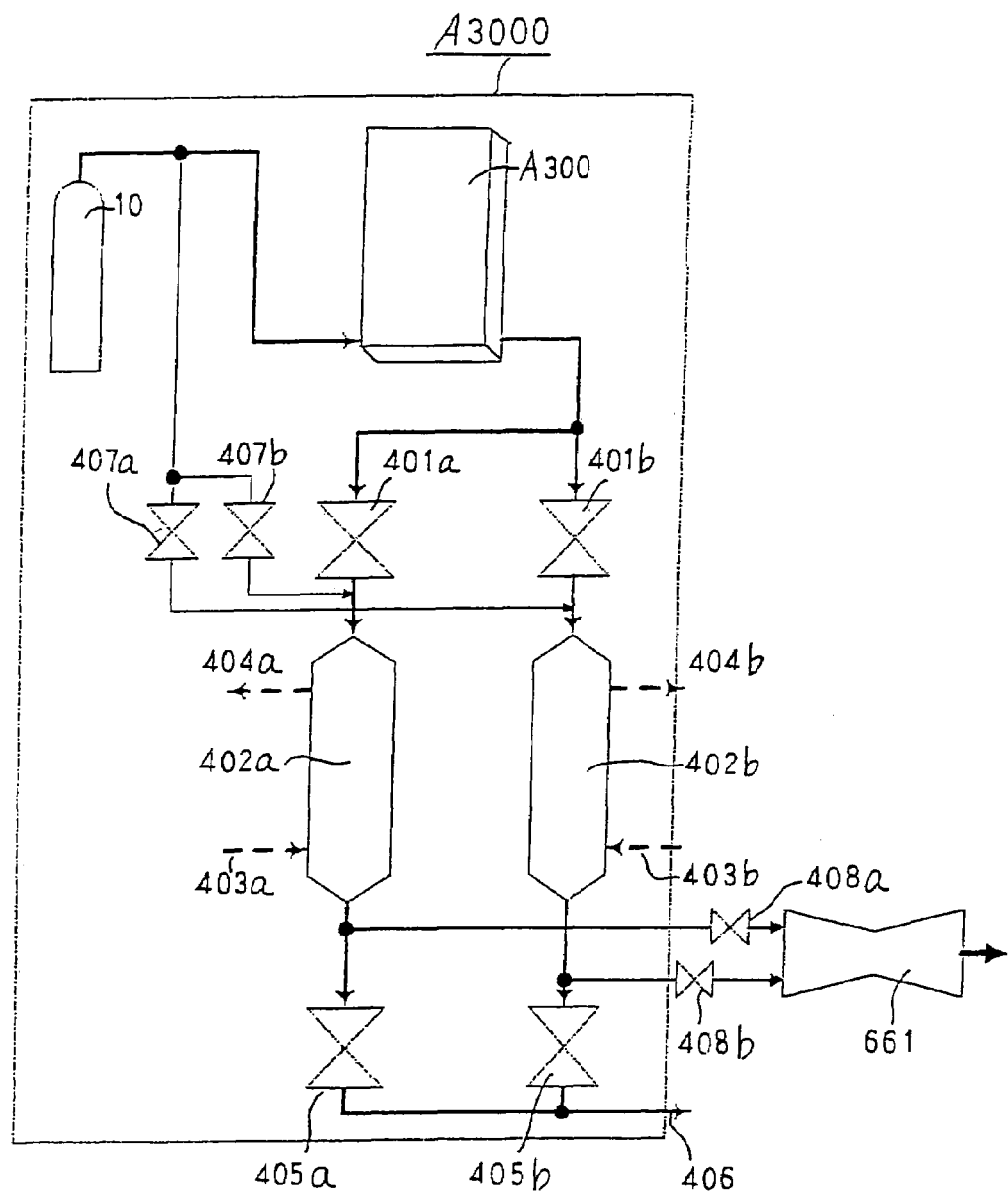
FIG. 22 is a structural view showing an ozone condensing apparatus using an ozone generator system for generating nitrogen-free ozone gas in embodiment 8.

FIG. 22 is a structural view of an ozone condensing apparatus using a nitrogen-free ozone gas. In the drawing, A300 denotes an ozone generator system which receives the supply of an oxygen gas from an oxygen gas cylinder 10, and denotes the ozone generator system of embodiment 1. Reference numerals 401a and 401b denote adsorption control valves A and B; and 402a and 402b, ozone gas adsorption towers. Reference numerals 403a and 403b denote cooling medium inlets for cooling the ozone gas adsorption towers; and 404a and 404b, cooling medium outlets for cooling the ozone gas adsorption towers. Reference numerals 405a and 405b denote valves for ozone gas desorption control; and 406, a condensed super high concentration ozone gas. Reference numerals 407a and 407b denote desorbing valves A and B for supplying a gas to desorb condensed ozone gas; 408a and 408b, exhaust gas valves A and B for exhausting a remaining oxygen gas after adsorption at an adsorption step of ozone gas; and 661, an air pump. Reference numeral A3000 denotes an ozone condensing apparatus.

(1) At the adsorption step of the ozone gas in the adsorption tower 402a, the ozone gas was supplied from the adsorption control valve A401a, and the ozone gas adsorption tower 402a was cooled by a cooling medium to about −60° C. to −100° C. Liquefied ozone is made to be adsorbed by a silica gel agent, the oxygen gas not adsorbed is exhausted as the remaining gas from the exhaust gas valve A408a, and the step is performed until a specified amount of liquefied ozone is adsorbed.

(2) At the adsorption step of the ozone gas in the adsorption tower 402b, the ozone gas was supplied from the adsorption control valve B401b, and the ozone gas adsorption tower 402b was cooled by a cooling medium to about −60° C. to −100° C. Liquefied ozone is made to be adsorbed by a silica gel agent, the oxygen gas not adsorbed is exhausted as the remaining gas from the exhaust gas valve B408b, and the step is performed until a specified amount of liquefied ozone is adsorbed.

(3) At a desorption step of the liquefied ozone adsorbed in the ozone gas adsorption tower 402a, the adsorption control valve A401a is closed, the cooled ozone gas adsorption tower 402a is heated to about 0° C., the desorption valve A407a is opened, a carrier gas is supplied to the ozone gas adsorption tower 402a, the adsorbed ozone is desorbed, and the super high concentration ozone gas is extracted from the desorption control valve A405a.

(4) At a desorption step of the liquefied ozone adsorbed in the ozone gas adsorption tower 402b, the adsorption control valve A401b is closed, the cooled ozone gas adsorption tower 402b is heated to about 0° C., the desorption valve B407b is opened, a carrier gas is supplied to the ozone gas adsorption tower 402b, the adsorbed ozone is desorbed, and the super high concentration ozone gas is extracted from the desorption control valve B405b.

In the two ozone gas adsorption towers 402a and 402b, the adsorption step of the ozone gas and the desorption step are alternately repeated, so that the super high concentration ozone gas can be extracted. When the nitrogen-free ozone gas not containing nitrogen, $NO_X$ and the like is used as the ozone gas to be condensed, the adsorption of an impurity gas to the condensing apparatus can be prevented, and since the adsorption of the impurity gas is not accumulated, lowering in performance of the condensing apparatus can be prevented. Even when the nitrogen suppression ozone generator system is used, since the nitrogen content is sufficiently low, lowering in performance of the condensing apparatus can be prevented by that.

Embodiment 9

Figure 23:
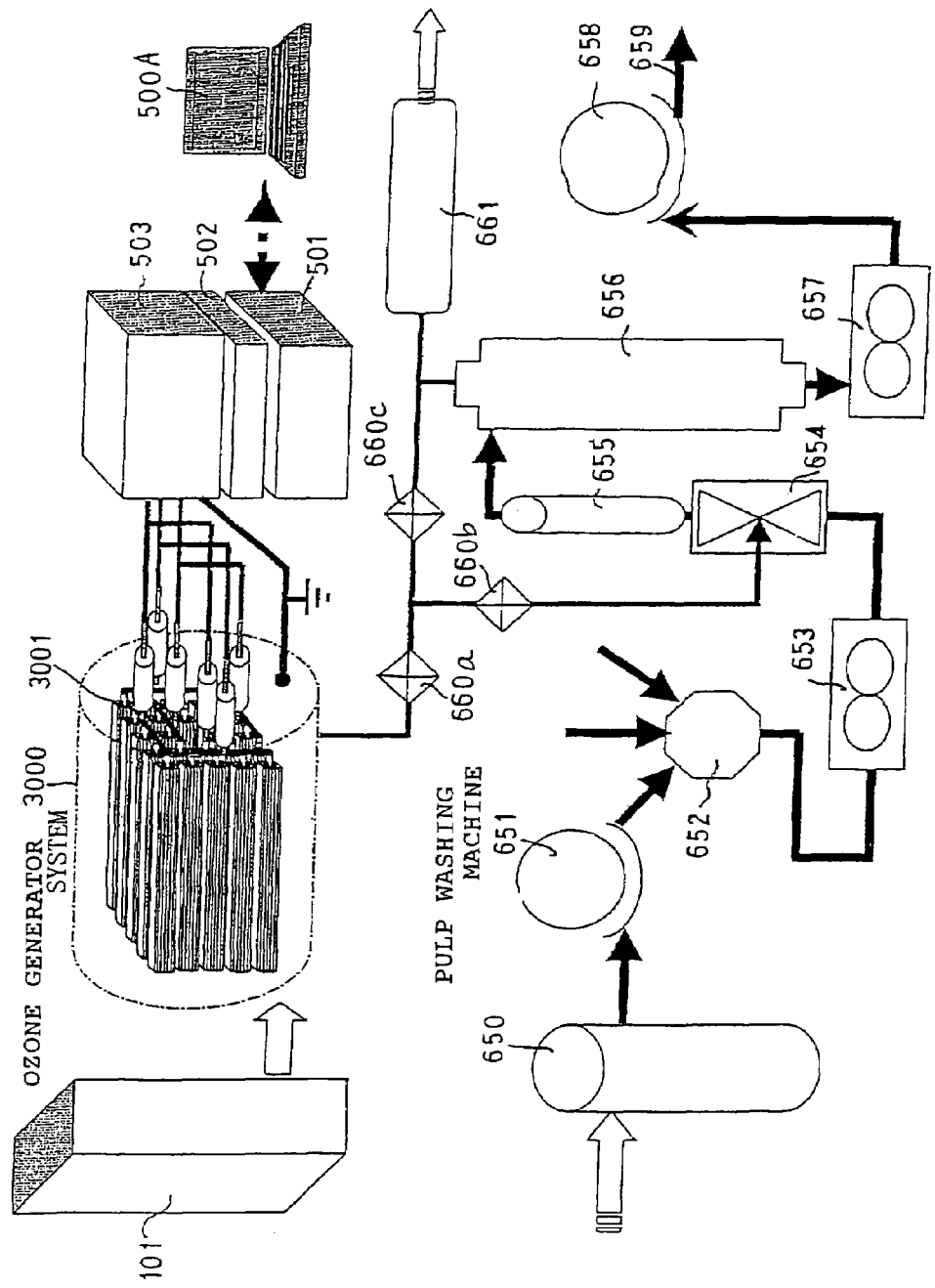
FIG. 23 is a structural view showing a pulp bleaching apparatus combined with a large ozone generator system for generating nitrogen-free ozone gas in embodiment 9.

FIG. 23 shows a pulp bleaching apparatus in which an oxygen PSA apparatus (Pressure Swing Absorber) for producing an oxygen gas by compressing the air in the atmosphere is combined with a large ozone generator system for generating a nitrogen-free ozone gas.

In ozone bleaching, not only a bleaching step by ozone, but also a multi-stage bleaching continuous step exists, and at a conventional step of chlorine bleaching, an ozone gas is used, and an oxygen bleaching stage (O step) not including at least chlorine, a peroxide bleaching stage (P step), an alkali extraction stage (E step), a high temperature alkali extraction stage (HAE step), an oxidizing stage (A step), and an ozone bleaching stage (Z step) are combined and are performed.

Reference numeral 101 denotes an oxygen PSA apparatus, and is the oxygen PSA apparatus in which the amount of a nitrogen gas contained in oxygen is made as small as possible, the purity of an oxygen gas is 93% or higher, and a remaining gas is almost made an argon gas. Reference numeral 3000 denotes an ozone generator system in which plural ozone generating cells are stacked into multi stages, they are made a unit, plural such ozone generating units 3001 are arranged, and an ozone generator system is made super large. Reference numeral 501 denotes a converter part for rectifying a supplied AC power supply; 502, an inverter part for converting a rectified DC into a high frequency AC; and 503, a high voltage conversion part for boosting the high frequency AC voltage. Reference numeral 500A denotes an ozone control instruction part to control the amount of ozone generation. Reference numeral 650 denotes an oxygen bleaching tower for performing oxygen bleaching at a preceding stage of performing ozone bleaching.

Reference numeral 651 denotes a pulp first washing machine for once washing the pulp subjected to the oxygen bleaching. Reference numeral 652 denotes a pulp dissolution mixture part for transforming the pulp into a pulp material with low viscosity by dilution of water and sulfuric acid. Reference numeral 653 denotes a pulp lifting pump for extruding the dissolved pulp. Reference numeral 654 denotes an ozone mixture part in which the ozone gas is injected into the extruded pulp. Reference numeral 655 denotes an ozone bleaching pulp staying tank in which the pulp injected with the ozone gas stays for a specified time so that ozone bleaching of the pulp is accelerated. Reference numeral 656 denotes a pulp-ozone gas separation tank for separating the bleached pulp from the remaining ozone. Reference numeral 657 denotes a pulp lifting pump for extruding the separated bleached pulp again to a next step process. Reference numeral 658 denotes a washing machine for washing the pulp subjected to the ozone bleaching, and the bleached pulp is extracted from this. Reference numeral 660a, 666b and 660c denote control valves for guiding the ozone gas from the ozone generator system to the pulp bleaching apparatus. Reference numeral 661 denotes an exhaust ozone apparatus to process the remaining ozone.

A nitrogen-free or nitrogen suppression ozone gas in which nitrogen content is made small is injected into the pulp in the ozone bleaching apparatus as stated above, so that the deterioration of the apparatus by nitrogen oxide of the ozone mixture part 654 for injecting ozone into pulp, the ozone bleaching pulp staying tank 655, the pulp-ozone gas separation tank 656, and the exhaust ozone apparatus 661 is suppressed, and the lifetime of each apparatus can be made long. Besides, when nitrogen oxide, nitric acid ($HNO_3$) or the like is contained, corrosion of a pipe through which the ozone passes is accelerated, however, this can be suppressed. Besides, the pulp produced by this apparatus has a possibility that deterioration of fiber strength can be suppressed.

Incidentally, in the prior art, in order to dissociate an oxygen molecule, the dissociation into oxygen atoms can be made by only the absorption of excimer light of ultraviolet light of 245 nm or less. In the invention, the method has been described in which dissociation into the oxygen atoms can be made by the discharge light having a light wavelength (visible light) of 428 nm to 620 nm and the catalytic material containing the photocatalytic material with a band gap of 2.0 eV to 2.9 eV and by the oxidation reaction of the oxygen molecule.

Besides, it has been described that by adding a trace amount, 10 ppm to 500 ppm, of nitrogen gas, dissociation into oxygen atoms can be performed by the discharge light of nitrogen and by the discharge light having a wavelength of 344 nm to 620 nm and the catalytic material including the photocatalytic material with a band gap of 2.0 eV to 3.6 eV.

A person skilled in the art should understand that there is a possibility that instead of the oxygen molecule, amino acid as a high molecule, sugar, or alcohol (objective material) can be effectively decomposed into a low molecular material or fermented by the discharge apparatus of silent discharge or the like, the photocatalytic material applied to the discharge region, and the semiconductor material, and by light longer than the light absorption wavelength of the objective material, and there is a possibility that more useful decomposition and fermentation can be performed by controlling the wavelength and light intensity of the discharge light by power input control of the discharge apparatus, and by selection of the photocatalytic material or the semiconductor material.

Further, aspergillus, yeast, or acetic acid bacteria, which accelerates fermentation decomposition (oxidation reaction) of a crop such as rice into amino acid or sugar or fermentation decomposition into alcohol, is regarded as an organic semiconductor (photocatalytic material) formed of a high molecule, and like the dissociation mechanism of oxygen in the invention, when the band gap of the aspergillus, yeast or acetic acid bacteria is given heat energy of specific temperature (range of about 20° C. to 30° C.) instead of light energy, the aspergillus, yeast or acetic acid bacteria itself is excited, and there is a possibility that the crop such as rice is fermented by the excited power, and it is expected that the invention is developed and contributes to various fields including an academic aspect.

INDUSTRIAL APPLICABILITY

The invention is suitably applied to the ozone generator system and the ozone generating method, and is suitably applied to the CVD apparatus or the ALD thin film deposition apparatus using the ozone gas since the high concentration ozone gas as the nitrogen-free ozone gas can be supplied. Besides, since the high concentration ozone gas as the nitrogen-free or nitrogen suppression ozone gas can be supplied, it is suitable for the product manufacture field of the ozone condensing apparatus, the pulp bleaching apparatus and the like, and is suitable for the compact product, the low power consumption product, and an environmentally sensitive product.

The invention claimed is:

1. A nitrogen-free ozone generator system, comprising:
a first electrode;
a second electrode which is opposite to the first electrode and forms a discharge region having a gap;
raw material gas supply means for supplying oxygen as a raw material gas; and
a catalytic material which is provided on a dielectric or an electrode in the discharge region and contains a photocatalytic material with a band gap energy of 2.0 eV to 2.9 eV, wherein, when an AC voltage is applied between the first electrode and the second electrode from a power supply to produce a discharge in the discharge region, and the oxygen is supplied from the raw material gas supply means to the discharge region, then discharge light having a wavelength in a range of 428 nm to 620 nm irradiates the catalytic material from the discharge, the catalytic material is excited to dissociate the oxygen passing through the discharge region into oxygen atoms, gas pressure of the discharge region through which the oxygen passes is kept at 0.1 MPa to 0.4 MPa, and the oxygen and the oxygen atoms are subjected to a bonding process to generate ozone.

2. The nitrogen-free ozone generator system according to claim 1, wherein the oxygen has a purity of at least 99.99%.

3. The nitrogen-free ozone generator system according to claim 1, wherein the gap of the discharge region is no larger than 0.6 mm.

4. The nitrogen-free ozone generator system according to claim 1, wherein the oxygen contains a noble gas, as an auxiliary gas, in a concentration of 500 ppm to 50000 ppm with respect to the oxygen, accelerating ozone generation.

5. The nitrogen-free ozone generator system according to claim 1, wherein the catalytic material is applied to a wall surface of the dielectric or the electrode in the discharge region, and a contact surface area between the catalytic material and the discharge light is 1.5 times as large as area of the dielectric or the electrode.

6. The nitrogen-free ozone generator system according to claim 1, wherein the catalytic material is a powder of the photocatalytic material having a particle diameter of 0.1 μm to 50 μm and adhered to a wall surface of the dielectric or the electrode in the discharge region to increase surface area.

7. The nitrogen-free ozone generator system according to claim 1, wherein a wall surface of the dielectric or the electrode in the discharge region has a roughness of 1 μm to 50 μm, and the catalytic material is provided on the wall surface so that surface area of the catalytic material is increased.

8. The nitrogen-free ozone generator system according to claim 1, wherein the dielectric in the discharge region is a dielectric through which the discharge light passes, and the catalytic material is a photocatalytic material powder of 1% to 10% in volume ratio contained in the dielectric through which the discharge light passes.

9. The nitrogen-free ozone generator system according to claim 1, wherein the dielectric in the discharge region is a dielectric through which the discharge light passes, the photocatalytic material is provided on the electrode in the discharge region, and the photocatalytic material on a discharge region side is covered with the dielectric through which the discharge light passes.

10. The nitrogen-free ozone generator system according to claim 1, wherein the photocatalytic material includes at least one material selected from the group consisting of $Cu_2O$, $In_2O_3$, $Fe_2TiO_3$, $Fe_2O_3$, $Cr_2O_3$, $PbO$, $V_2O_5$, $FeTiO_3$, $WO_3$, and $Bi_2O_3$.

11. The nitrogen-free ozone generator system according to claim 1, wherein the photocatalytic material includes at least one rare-earth metal ion selected from the group consisting of $Nb_{2m}P_4O_{6m+4}$, $W_{2m}P_4O_{6m+4}$, $Ta_{2m}P_4O_{6m+4}$, $In_{2m}P_4O_{4m+4}$, $BaTi_4O_9$, $MnTi_6O_{13}$, $TiO_aN_bF_c$, $SrTiO_aN_bF_c$, $BaTiO_aN_bF_c$, and combinations thereof.

12. The nitrogen-free ozone generator system according to claim 1, wherein the photocatalytic material is doped with a material, as an auxiliary catalyst, selected from the group consisting of Ru, Ni, Pt, RuO2, NiOX, and NiO.

13. The nitrogen-free ozone generator system according to claim 4, wherein the catalytic material is applied to a wall surface of the dielectric or the electrode in the discharge region, and a contact surface area between the catalytic material and the discharge light is 1.5 times as large as area of the dielectric or the electrode.

14. The nitrogen-free ozone generator system according to claim 4, wherein the catalytic material is a powder of the photocatalytic material having a particle diameter of 0.1 μm to 50 μm and adhered to a wall surface of the dielectric or the electrode in the discharge region to increase surface area.

15. The nitrogen-free ozone generator system according to claim 4, wherein a wall surface of the dielectric or the electrode in the discharge region has a roughness of 1 μm to 50 μm, and the catalytic material is provided on the wall surface so that surface area of the catalytic material is increased.

16. The nitrogen-free ozone generator system according to claim 4, wherein the dielectric in the discharge region is a dielectric through which the discharge light passes, and the catalytic material is a photocatalytic material powder of 1% to 10% in volume ratio contained in the dielectric through which the discharge light passes.

17. The nitrogen-free ozone generator system according to claim 4, wherein the dielectric in the discharge region is a dielectric through which the discharge light passes, the photocatalytic material is provided on the electrode in the discharge region, and the photocatalytic material on a discharge region side is covered with the dielectric through which the discharge light passes.

18. The nitrogen-free ozone generator system according to claim 4, wherein the photocatalytic material includes at least one material selected from the group consisting of $Cu_2O$, $In_2O_3$, $Fe_2TiO_3$, $Fe_2O_3$, $Cr_2O_3$, $PbO$, $V_2O_5$, $FeTiO_3$, $WO_3$, and $Bi_2O_3$.

19. The nitrogen-free ozone generator system according to claim 4, wherein the photocatalytic material includes at least one rare-earth metal ion complex selected from the group consisting of $Nb_{2m}P_4O_{6m+4}$, $W_{2m}P_4O_{6m+4}$, $Ta_{2m}P_4O_{6m+4}$, $In_{2m}P_4O_{4m+4}$, $BaTi_4O_9$, $MnTi_6O_{13}$, $TiO_aN_bF_c$, $SrTiO_aN_bF_c$, $BaTiO_aN_bF_c$, and mixtures thereof.

20. The nitrogen-free ozone generator system according to claim 4, wherein the photocatalytic material, is doped with a material as an auxiliary catalyst, selected from the group consisting of Ru, Ni, Pt, RuO2, NiOX, and NiO.

21. The nitrogen-free ozone generator system according to claim 1, used for a chemical vapor deposition apparatus or an ALD (atomic layer deposition) thin film deposition apparatus.

22. The nitrogen-free ozone generator system according to claim 1, used for a chemical vapor deposition apparatus or an ALD (atomic layer deposition) thin film deposition apparatus for producing any one of a nonvolatile memory ferroelectric thin film, a high dielectric constant dielectric thin film, a nitride metal thin film, an oxide metal, an optical material thin film, a high density photomagnetic recording thin film, a superconducting thin film, and a high quality capacitor thin film.

23. The nitrogen-free ozone generator system according to claim 1, used for an ozone condensing apparatus.

24. The nitrogen-free ozone generator system according to claim 1, used for a pulp bleaching apparatus.

25. A nitrogen suppression ozone generator system, comprising:
- a first electrode;
- a second electrode which is opposite to the first electrode and forms a discharge region having a gap;
- raw material gas supply means for supplying oxygen as a raw material gas;
- nitrogen gas supply means for supplying nitrogen; and
- a catalytic material which is provided on a dielectric or an electrode in the discharge region and contains a photocatalytic material with a band gap energy of 2.0 eV to 3.6 eV, wherein, when an AC voltage is applied between the first electrode and the second electrode from a power supply to produce a discharge in the discharge region, and the oxygen is supplied from the raw material gas supply means to the discharge region, the nitrogen, in a range of 10 ppm to 500 ppm, is supplied for acceleration of an ozone generation reaction to the oxygen from the nitrogen gas supply means, then discharge light having a wavelength in a range of 344 nm to 620 nm irradiates the catalytic material from the discharge, the catalytic material is excited to dissociate the oxygen passing through the discharge region into oxygen atoms, gas pressure of the discharge region through which the oxygen passes is kept at 0.1 MPa to 0.4 MPa, and the oxygen and the oxygen atoms are subjected to a bonding process to generate ozone.

26. The nitrogen suppression ozone generator system according to claim 25, wherein the oxygen contains a noble gas, as an auxiliary gas, in a concentration of 500 ppm to 50000 ppm with respect to the oxygen, accelerating ozone generation.

27. The nitrogen suppression ozone generator system according to claim 25, wherein the catalytic material is applied to a wall surface of the dielectric or the electrode in the discharge region, and a contact surface area between the catalytic material and the discharge light is 1.5 times as large as area of the dielectric or the electrode.

28. The nitrogen suppression ozone generator system according to claim 25, wherein the catalytic material is a powder of the photocatalytic material having a particle diameter of 0.1 μm to 50 μm and adhered to a wall surface of the dielectric or the electrode in the discharge region to increase surface area.

29. The nitrogen suppression ozone generator system according to claim 25, wherein a wall surface of the dielectric or the electrode in the discharge region has a roughness of 1 μm to 50 μm, and the catalytic material is provided on the wall surface, so that surface area of the catalytic material is increased.

30. The nitrogen suppression ozone generator system according to claim 25, wherein the dielectric in the discharge region is a dielectric through which the discharge light passes, and the catalytic material is a photocatalytic material powder of 1% to 10% in volume ratio contained in the dielectric through which the discharge light passes.

31. A nitrogen-free ozone generating method employing a first electrode, a second electrode which is opposite to the first electrode and forms a discharge region, containing a photocatalytic material with a band gap energy of 2.0 eV to 2.9 eV, the method comprising:
- applying an AC voltage between the first electrode and the second electrode to produce a discharge in the discharge region,
- supplying oxygen to the discharge region, thereby producing discharge light having a wavelength in a range of 428 nm to 620 nm and irradiating the catalytic material from the discharge,
- exciting the catalytic material to dissociate the oxygen passing through the discharge region into oxygen atoms, and
- maintaining gas pressure of the discharge region at 0.1 MPa to 0.4 MPa, so that the oxygen and the oxygen atoms bond to generate ozone.

32. A nitrogen suppression ozone generating method employing a first electrode, a second electrode which is opposite to the first electrode and forms a discharge region, and a catalytic material containing a photocatalytic material with a band gap energy of 2.0 eV to 3.6 eV, the method comprising:
- applying an AC voltage between the first electrode and the second electrode to produce a discharge in the discharge region,
- supplying oxygen gas to the discharge region,
- supplying nitrogen gas in a concentration range of 10 ppm to 500 ppm to the oxygen for acceleration of ozone generation, thereby producing discharge light having a light wavelength in a range of 344 nm to 620 nm and irradiating the catalytic material from the discharge,
- exciting the catalytic material to dissociate the oxygen passing through the discharge region,
- maintaining gas pressure of the discharge region at 0.1 MPa to 0.4 MPa, so the oxygen and the oxygen atoms bond to generate ozone.

* * * * *